(12) United States Patent
Godard et al.

(10) Patent No.: US 9,817,669 B2
(45) Date of Patent: Nov. 14, 2017

(54) COMPUTER PROCESSOR EMPLOYING EXPLICIT OPERATIONS THAT SUPPORT EXECUTION OF SOFTWARE PIPELINED LOOPS AND A COMPILER THAT UTILIZES SUCH OPERATIONS FOR SCHEDULING SOFTWARE PIPELINED LOOPS

(71) Applicant: Mill Computing, Inc., Palo Alto, CA (US)

(72) Inventors: Roger Rawson Godard, East Palo Alto, CA (US); Arthur David Kahlich, Sunnyvale, CA (US); David Arthur Yost, Los Altos, CA (US)

(73) Assignee: Mill Computing, Inc., Palo Alto, CA (US)

( * ) Notice: Subject to any disclaimer, the term of this patent is extended or adjusted under 35 U.S.C. 154(b) by 216 days.

(21) Appl. No.: 14/797,432

(22) Filed: Jul. 13, 2015

(65) Prior Publication Data

US 2016/0011871 A1    Jan. 14, 2016

Related U.S. Application Data

(60) Provisional application No. 62/024,055, filed on Jul. 14, 2014.

(51) Int. Cl.
*G06F 9/38* (2006.01)
*G06F 9/30* (2006.01)
*G06F 9/45* (2006.01)

(52) U.S. Cl.
CPC ............ *G06F 9/3857* (2013.01); *G06F 8/452* (2013.01); *G06F 9/3016* (2013.01); *G06F 9/30036* (2013.01)

(58) Field of Classification Search
CPC ...... G06F 8/452; G06F 8/4452; G06F 9/3857; G06F 9/30065

(Continued)

(56) References Cited

U.S. PATENT DOCUMENTS 5,159,680 A    10/1992  Joy et al.
5,490,255 A  *  2/1996  Rawlinson .......... G06F 9/30025
                                                    712/219

(Continued)

OTHER PUBLICATIONS

Abderazek, Ba et al. Queue Processor Architecture for Novel Queue Computing Paradigm Based on Produced Order Scheme. 7th Intnl. Conf. on HPC and Grid in APA [online], 2004 [retrieved on Jun. 16, 2017]. Retrieved from the Internet <URL: http://ieeexplore.ieee.org/abstract/document/1324032/> <DOI: 10.1109/HPCASIA.2004.1324032>.*

(Continued)

*Primary Examiner* — Keith Vicary
*Assistant Examiner* — Shawn Doman
(74) *Attorney, Agent, or Firm* — Gordon & Jacobson, P.C.

(57) ABSTRACT

A computer processor includes execution logic (having a number of functional units) configured to perform operations that access operand data values stored in a plurality of operand storage elements. Such operand data values include a predefined None operand data value indicative of a missing operand value. The operations include a RETIRE operation specifying a number of operand data values that is intended to be retired in a predefined machine cycle. During execution of the RETIRE operation, zero or more at None operand data values are selectively retired in the predefined machine cycle based on the number of operand data values specified by the RETIRE operation and the number of operand data values to be retired as a result of execution of other operations by the execution logic in the predefined machine cycle. Other aspects and software tools are also described and claimed.

23 Claims, 15 Drawing Sheets

(58) Field of Classification Search
USPC .................................. 712/1, 200, 202, 241
See application file for complete search history.

(56) References Cited

U.S. PATENT DOCUMENTS

| | | | |
|---|---|---|---|
| 5,564,031 | A | 10/1996 | Amerson et al. |
| 5,805,853 | A | 9/1998 | White et al. |
| 5,974,538 | A | 10/1999 | Wilmot, II |
| 6,112,019 | A * | 8/2000 | Chamdani ............. G06F 9/3836 712/214 |
| 6,209,082 | B1 * | 3/2001 | Col ....................... G06F 9/3005 712/225 |
| 6,651,247 | B1 | 11/2003 | Srinivasan |
| 7,836,279 | B2 | 11/2010 | Colavin et al. |
| 9,092,214 | B2 * | 7/2015 | Knauth ............... G06F 9/30109 |
| 9,395,962 | B2 * | 7/2016 | Ahn ....................... G06F 8/4452 |
| 9,606,909 | B1 * | 3/2017 | Vincent ................. G06F 12/023 |
| 2002/0007450 | A1 | 1/2002 | Witt et al. |
| 2004/0088526 | A1 * | 5/2004 | Colavin .............. G06F 9/30072 712/226 |
| 2005/0071607 | A1 * | 3/2005 | Muthukumar ........ G06F 8/4452 712/227 |
| 2008/0209174 | A1 | 8/2008 | Zhu et al. |
| 2009/0019262 | A1 * | 1/2009 | Tashiro ................. G06F 9/3016 712/208 |
| 2010/0070741 | A1 | 3/2010 | Col et al. |
| 2010/0318772 | A1 * | 12/2010 | Sudhakar ............ G06F 9/30032 712/222 |

OTHER PUBLICATIONS

Compiler Transformations for High-Performance Computing, David F. Bacon et al., ACM Computing Surveys, vol. 26, No. 4, Dec. 1994.
Evaluating the Use of Register Queues in Software Pipelined Loops, Gary S. Tyson et al., IEEE Transactions on Computers, vol. 50, No. 8, Aug. 2001.

* cited by examiner

Fetch → Decode → Issue → Execute → Retire retire operation specifies an integer value (zero or more)

the specified integer value is the number of operand values to drop onto the belt in the machine cycle which the retire operation executes if the specified number of operand values are not produced by the execution logic of the CPU in this machine cycle, the execution of the retire operation drops one or more Nones onto the belt in this machine cycle as necessary in order to make up for the difference; the width of each None can be "unknown" or specified by the retire operation

FIG. 4

Example A:
    retire (2); and
    the execution logic of the CPU (other than execution of the retire (2) operation) produces zero (0) operand values in the machine cycle that the retire (2) operation executes in this case, the execution of the retire (2) operation drops two (2) Nones onto the belt in this machine cycle Example B:
    retire (2); and
    the execution logic of the CPU (other than execution of the retire (2) operation) produces one (1) operand value in the machine cycle that the retire (2) operation executes in this case, the execution of the retire (2) operation drops one (1) None onto the belt in this machine cycle

FIG. 5A

Example C:
  retire (2); and
  the execution logic of the CPU (other than execution of the retire (2) operation) produces two (2) operand value in the machine cycle that the retire (2) operation executes In this case, the execution of the retire (2) operation drops zero (0) Nones onto the belt in this machine cycle Example D:
  retire (2); and
  the execution logic of the CPU (other than execution of the retire (2) operation) produces three or more (3+) operand values in the machine cycle that the retire (2) operation executes In this case, the execution of the retire (2) operation raises a fault in this machine cycle

FIG. 5B

COMPUTER PROCESSOR EMPLOYING EXPLICIT OPERATIONS THAT SUPPORT EXECUTION OF SOFTWARE PIPELINED LOOPS AND A COMPILER THAT UTILIZES SUCH OPERATIONS FOR SCHEDULING SOFTWARE PIPELINED LOOPS

CROSS-REFERENCE TO RELATED APPLICATION(S)

The present application claims the benefit of U.S. Provisional Patent No. 62/024,055, filed on Jul. 14, 2014, entitled "COMPUTER PROCESSOR EMPLOYING EXPLICIT OPERATIONS THAT SUPPORT EXECUTION OF SOFTWARE PIPELINED LOOPS AND A COMPILER THAT UTILIZES SUCH OPERATIONS FOR SCHEDULING SOFTWARE PIPELINED LOOPS," herein incorporated by reference in its entirety.

BACKGROUND

1. Field

The present application relates generally to computer processors and, more specifically, to mechanisms that support execution of software pipelined loops.

2. State of the Art

Computer processors execute operations on data. An individual data value (an operand) is produced by some producer operation, recorded, and then used later by one or more other consumer operations. The time between production and consumption by the last consumer is the lifetime of the operand. Operands vary widely in lifetime, but lifetimes can usually be loosely categorized into persistent (or global) lifetimes that last for an appreciable fraction of total program execution; local lifetimes that last for the duration of a function or several statements in the program; and transient lifetimes that last for only portions of a single expression in the program. These categories are not sharp, and programs exhibit a continuum of lifetimes, but the rough grouping is strong enough that computer hardware usually contains different storage means for operands of each category. For example, persistent operands may use a software-provided heap in memory, while local operands may use a hardware-assisted stack and transient operands use a wholly hardware register bank.

Transient operands are ubiquitous and very common. For example, if the source program contains the expression "A+B+C" then the computer will execute a first add operation of A and B, and then a second add operation of the result of the first add operation to C. The A+B result is typically transient and will be discarded as soon as it is consumed by the second add operation, although it may have a longer lifetime if the same A+B calculation appears elsewhere and the intermediate result can be reused.

Many prior art computer processors employ a set of general registers, which are storage devices that can hold a single operand each. Machine operations like addition take their arguments from and deliver their result to registers. Thus, a register is the holding place for transient operands. When the lifetime of an operand ends, the register holding it can simply be overwritten by some other newly computed operand. Register usage by a program is very high because there are so many transients. Consequently, computer processor designers go to great lengths to ensure that access to registers is very fast and that there are enough registers to hold any reasonable transient population. Operands that do not fit in the available registers must be kept elsewhere, typically in memory, and access to such spilled operands takes tens to hundreds of times longer than access to a register. Because of the speed advantage of registers, registers not needed for transients are commonly used for frequently-referenced operands with more-than-transient lifetimes, even very long lived global operands. Each extra operand that can reside in the registers improves the speed of the program by avoiding lengthy memory access.

Optimizing compilers can employ an instruction scheduling technique known as software pipelining, which parallelizes a loop by overlapping the execution of different iterations of the loop. Rotating register space, as used by the SPARC and Itanium architectures, can be used by a software pipelined loop in order to store the operands over the iterations of the loop. The registers of the rotating register space are typically sized to fit the largest possible operand, which can be quite large for vector data, but are frequently occupied by small operands, wasting the hardware on unused storage. Furthermore, the number of registers is fixed by design and cannot be dynamically configured based on the needs of the program. Furthermore, rotating registers are typically used for computation temporaries as well as for loop-carried variables. When the registers are rotated, dead registers rotate too, as well as those that are live over the iterations. This waste increases the register pressure, and complex code may run out of registers.

SUMMARY

A computer processor is provided that includes a plurality of operand storage elements that store operand data values as well as execution logic including a number of functional units operably coupled to the plurality of operand storage elements. The execution logic is configured to perform operations that access the operand data values stored in the plurality of operand storage elements. Such operand data values include a predefined None operand data value that is indicative of a missing operand value. The operations include a predefined operation (referred to as a RETIRE operation) that specifies a number of operand data values that is intended to be retired in a predefined machine cycle. During execution of the RETIRE operation, zero or more None operand data values are selectively retired in the predefined machine cycle based on the number of operand data values specified by the RETIRE operation and the number of operand data values to be retired as a result of execution of other operations by the execution logic in the predefined machine cycle.

The execution logic can be is configured such that, when processing a speculable operation that operates on a None operand data value, the None operand data value propagates to the result of such speculable operation.

The execution logic can also be configured such that, when processing a non-speculable operation (such as a store operation of operand data to memory) that operates on a None operand data value to update state information of the computer processor, the execution logic skips the non-speculable operation and thus does not update the state information of the computer processor.

In one embodiment, during execution of the RETIRE operation, in the event that the number of operand data values specified by the RETIRE operation is greater than the number of operand data values to be retired as a result by execution of other operations by the execution logic in the predefined machine cycle, the execution of the RETIRE operation is configured to retire a number of None operand data values representing difference between the number of operand data values specified by the RETIRE operation and the number of operand data values to be retired as a result of execution of other operations by the execution logic in the predefined machine cycle.

In another embodiment, during execution of the RETIRE operation, in the event that the number of operand data values specified by the RETIRE operation matches the number of operand data values retired by execution of other operations by the execution logic in the predefined machine cycle, the execution of the RETIRE operation is configured to perform a no-op.

In yet another embodiment, during execution of the RETIRE operation, in the event that the number of operand data values specified by the RETIRE operation is less than the number of operand data values to be retired as a result of execution of other operations by the execution logic in the predefined machine cycle, the execution of the RETIRE operation signals a machine fault.

In one embodiment, the predefined machine cycle can be the machine cycle in which the RETIRE operation executes.

In one embodiment, the plurality of operand storage elements can be organized as a logical belt. During execution of the RETIRE operation, zero or more None operand data values can be retired in the predefined machine cycle by dropping the zero or more None operand data values onto the logical belt (for example, onto the front of the logical belt).

In yet another embodiment, during execution of the RETIRE operation, at least one None operand data value of undefined scalarity and element width can be retired in the predefined machine cycle.

In one embodiment, the RETIRE operation can specify an integer value representing a static count of operand data values that is intended to be retired in a predefined machine cycle.

In another embodiment, the RETIRE operation can also specify a list of one or more tags specifying scalarity and element width for a corresponding operand data value that is intended to be retired in a predefined machine cycle, wherein the number of tags represents a static count of operand data values that is intended to be retired in a predefined machine cycle.

In one embodiment, the operand data values can be stored with associated meta-data as unitary operand data elements in the plurality of operand storage elements. The type of the unitary operand data element can be selected from the group consisting of i) a scalar operand type that represents a single scalar operand value and ii) a vector operand type that represents a number of scalar operand values. The operand data value can be represented by at least one payload data element that is physically associated with the meta-data of the unitary data element.

In another embodiment, the execution logic can further support a predefined operation (referred to as an INNER operation) whose execution defines a new empty logical belt for the operations of a loop. And the execution logic can further supports another predefined operation (that is referred to as a LEAVE operation) that is paired with an INNER operation for the operations of a loop, wherein the execution of the LEAVE operation restores the logical belt to its state prior to the paired INNER operation and then drops arguments specified as part of the LEAVE operation onto the front of the restored logical belt.

In another aspect, a computer processor is provided that includes a first memory structure that stores operands. Execution logic (including a number of functional units) is operably coupled to the first memory structure. The execution logic is configured to perform operations that access the operands stored in the first memory structure. A second memory structure, separate from the first memory structure, is configured as a dedicated memory storing operands copied from the first memory structure. The second memory structure is accessed by mapping logical addresses to physical addresses by data structures that control respective portions of the logical address space of the second memory structure.

In one embodiment, the given data structure includes bounds information that defines the portion of the logical address space of the second memory structure that is controlled by the given data structure. Each given data structure can further include a cursor value for mapping a logical address within the portion of the logical address space of the second memory structure that is controlled by the given data structure to a physical address of the second memory structure. In mapping a given logical address of the second memory structure to a corresponding physical address of the second memory structure, the data structure that corresponds to a given logical address of the second memory structure can be identified by comparing the given logical address to the bounds information for one or more data structures. The corresponding physical address of the second memory structure can be computed by i) deriving an address RA by summing the given logical address and the cursor value of the data structure that is identified to correspond to a given logical address modulo size of the logical address of the second memory structure that is controlled by such data structure to support wrap-around, and ii) summing the address RA to a Base address, modulo size of the size of the second memory structure to support wrap-around.

The execution logic can be configured to execute a predefined operation (referred to as a ROTATE operation) that specifies a static length that is used to update the cursor value of one of such data structures (e.g., the youngest data structure). The cursor value of the one data structure can be updated by advancing the cursor value by the static length specified by the ROTATE operation modulo size of the logical address of the second memory structure that is controlled by such data structure to support wrap-around.

The second memory structure can be organized with a byte-addressable memory space and each operand stored in the second memory structure is accessed by a given byte address into the byte-addressable memory space.

In yet another aspect, a software tool can be provided for use with the computer processor as described herein. The software tool can be configured to represent a loop of operations with a loop body and loop head that includes number of operations repeated for all iterations of the loop. The loop head can include a RETIRE operation that specifies a number of operand data values that is intended to be retired for steady state operations of the loop body. This allows the representation of the loop of operations to omit any prologue, thereby conserving code space used to represent the loop in the memory system of the computer processor.

BRIEF DESCRIPTION OF THE DRAWINGS

FIG. 4 is chart illustrating the specifics of a RETIRE operation that can be executed by the execution logic of the computer processor of FIG. 1 according to the illustrative embodiments of the present application.

FIGS. 5A and 5B illustrate examples of the execution of the RETIRE operation of FIG. 4.

DETAILED DESCRIPTION OF ILLUSTRATIVE EMBODIMENTS

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, or branch operation.

The term "instruction" is a unit of logical encoding including zero or more operations. For the case where an instruction includes multiple operations, the multiple operations are semantically performed together.

Figure 1A:
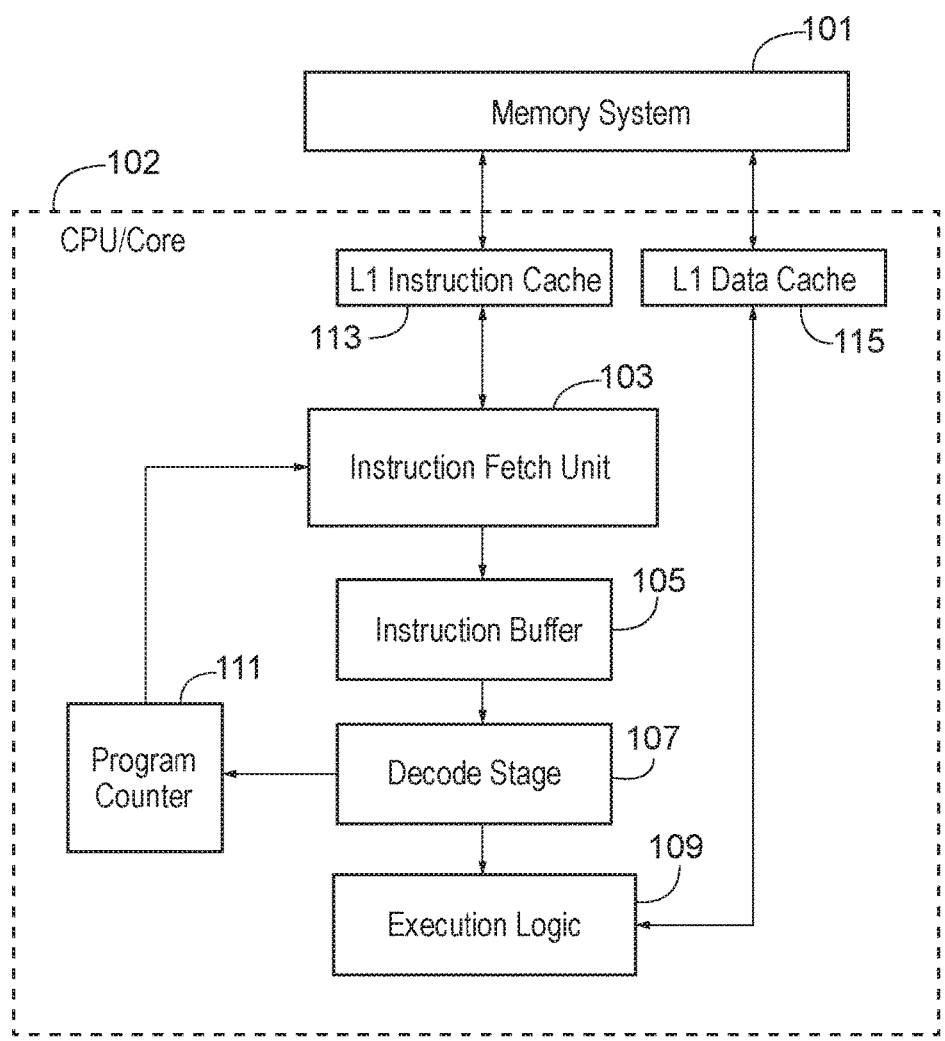
FIG. 1A is a schematic block diagram of a computer processing system according to an embodiment of the present disclosure.

In accordance with the present disclosure, a sequence of instructions is stored in the memory system 101 and processed by a CPU (or Core) 102 as shown in the exemplary embodiment of FIG. 1. The CPU 102 includes a number of instruction processing stages including at least one instruction fetch unit (one shown as 103), at least one instruction buffer or queue (one shown as 105), at least one decode stage (one shown as 107) and execution logic 109 that are arranged in a pipeline manner as shown. The CPU 102 also includes at least one program counter (one shown as 111), at least one L1 instruction cache (one shown as 113), and an L1 data cache 115.

The L1 instruction cache 113 and the L1 data cache 115 are logically part of the hierarchy of the memory system 101. The L1 instruction cache 113 is a cache that stores copies of instruction portions stored in the memory system 101 in order to reduce the latency (i.e., the average time) for accessing the instruction portions stored in the memory system 101. In order to reduce such latency, the L1 instruction cache 113 can take advantage of two types of memory localities, including temporal locality (meaning that the same instruction will often be accessed again soon) and spatial locality (meaning that the next memory access for instructions is often very close to the last memory access or recent memory accesses for instructions). The L1 instruction cache 113 can be organized as a set-associative cache structure, a fully associative cache structure, or a direct mapped cache structure as is well known in the art. Similarly, the L1 data cache 115 is a cache that stores copies of operands stored in the memory system 101 in order to reduce the latency (i.e., the average time) for accessing the operands stored in the memory system 101. In order to reduce such latency, the L1 data cache 115 can take advantage of two types of memory localities, including temporal locality (meaning that the same operand will often be accessed again soon) and spatial locality (meaning that the next memory access for operands is often very close to the last memory access or recent memory accesses for operands). The L1 data cache 115 can be organized as a set-associative cache structure, a fully associative cache structure, or a direct mapped cache structure as is well known in the art. The hierarchy of the memory system 101 can also include additional levels of cache memory, such as a level 2 and level 3 caches, as well as system memory. One or more of these additional levels of the cache memory can be integrated with the CPU 102 as is well known. The details of the organization of the memory hierarchy are not particularly relevant to the present disclosure and thus are omitted from the figures of the present disclosure for sake of simplicity.

The program counter 111 stores the memory address for a particular instruction and thus indicates where the instruction processing stages are in processing the sequence of instructions. The memory address stored in the program counter 111 can be used to control the fetching of the instructions by the instruction fetch unit 103. Specifically, the program counter 111 can store the memory address for the instruction to fetch. This memory address can be derived from a predicted (or resolved) target address of a control-flow operation (such as a BRANCH or CALL operation), the saved address in the case of a RETURN operation, or the sum of memory address of the previous instruction and the length of previous instruction. The memory address stored in the program counter 111 can be logically partitioned into a number of high-order bits representing a cache line address ($ Cache Line) and a number of low-order bits representing a byte offset within the cache line for the instruction.

The instruction fetch unit 103, when activated, sends a request to the L1 instruction cache 113 to fetch a cache line from the L1 instruction cache 113 at a specified cache line address ($ Cache Line). This cache line address can be derived from the high-order bits of the program counter 111. The L1 instruction cache 113 services this request (possibly accessing higher levels of the memory system 101 if missed in the L1 instruction cache 113), and supplies the requested cache line to the instruction fetch unit 103. The instruction fetch unit 103 passes the cache line returned from the L1 instruction cache 113 to the instruction buffer or queue 105 for storage therein.

The decode stage 107 is configured to decode one or more instructions stored in the instruction buffer or queue 105. Such decoding generally involves parsing and decoding the bits of the instruction to determine the type of operation(s) encoded by the instruction and generate control signals required for execution of the operation(s) encoded by the instruction by the execution logic 109.

The execution logic 109 utilizes the results of the decode stage 107 to execute the operation(s) encoded by the instructions. The execution logic 109 can send a load request to the L1 data cache 115 to fetch data from the L1 data cache 115 at a specified memory address. The L1 data cache 115 services this load request (possibly accessing higher levels of the memory system 101 if missed in the L1 data cache 115), and supplies the requested data to the execution logic 109. The execution logic 109 can also send a store request to the L1 data cache 115 to store data into the L1 data cache 115 at a specified address. The L1 data cache 115 services this store request by storing such data at the specified address (which possibly involves overwriting data stored by the L1 data cache 115).

Figure 1B:
FIG. 1B is a schematic diagram of exemplary pipeline of processing stages that can be embodiment by the computer processor of FIG. 1A.

The instruction processing stages of the CPU 102 can achieve high performance by processing each instruction and its associated operation(s) as a sequence of stages each being executable in parallel with the other stages. An instruction and its associated operation(s) can be processed in four stages, namely, fetch, decode, issue, execute and retire as shown in FIG. 1B.

In the fetch stage, the instruction fetch unit 103 sends a request to the L1 instruction cache 113 to fetch a cache line from the L1 instruction cache 113 at a specified cache line address ($ Cache Line). The instruction fetch unit 103 passes the cache line returned from the L1 instruction cache 113 to the instruction buffer or queue 105 for storage therein.

The decode stage 107 decodes one or more instructions stored in the instruction buffer 107. Such decoding generally involves parsing and decoding the bits of the instruction to determine the type of operation(s) encoded by the instruction and generating control signals required for execution of the operation(s) encoded by the instruction by the execution logic 109. For the case where the instructions are wide instructions with a number of slots, the operations of the decode stage 107 can involve parsing slot-sized units according to the logical arrangement of slots within the instruction and decoding the operations of the units to generate control signals for execution of the operations of the slots of the instruction.

In the issue stage, one or more operations as decoded by the decode stage are issued to the execution logic 109 and begin execution. For the case where the instructions are wide instructions with a number of slots, multiple operations encoded by the wide instruction can be issued in parallel and all can begin execution together in the issue stage. Not all operations encoded by the wide instruction are required to be issued together in the issue stage.

In the execute stage, issued operations are executed by the functional units of the execution logic 109 of the CPU 102.

In the retire stage, the results of one or more operations produced by the execution logic 109 are stored by the CPU 102 as result operands for use by one or more other consumer operations in subsequent issue cycles.

During the execution of an operation by the execution logic 109 in the execution stage, the functional units can access and/or consume operands that have been stored by the retire stage of the CPU 102. Note that some operations take longer to finish execution than others. The duration of execution, in cycles, is the latency of an operation. Thus, the operations of the retire stage can be latency cycles after the issuance. Issued operations that have not yet completed and retired are "in-flight." Occasionally, the CPU 102 can stall for a few cycles. Nothing issues or retires during a stall and in-flight operations remain in-flight.

The execution logic 109 includes one or more functional units (FUs) which perform predefined operations such as adding two numbers, moving data from the CPU proper to and from locations outside the CPU (such as to and from the memory hierarchy including the L1 Data Cache 115 and the Memory System 101), and holding operands for later use, all as are well known in the art. Also within the execution logic 109 is a connection fabric or routing network functionality connected to the FUs so that data produced by a producer (source) FU can be passed to a consumer (sink) FU for further storage or operations.

Figure 2:
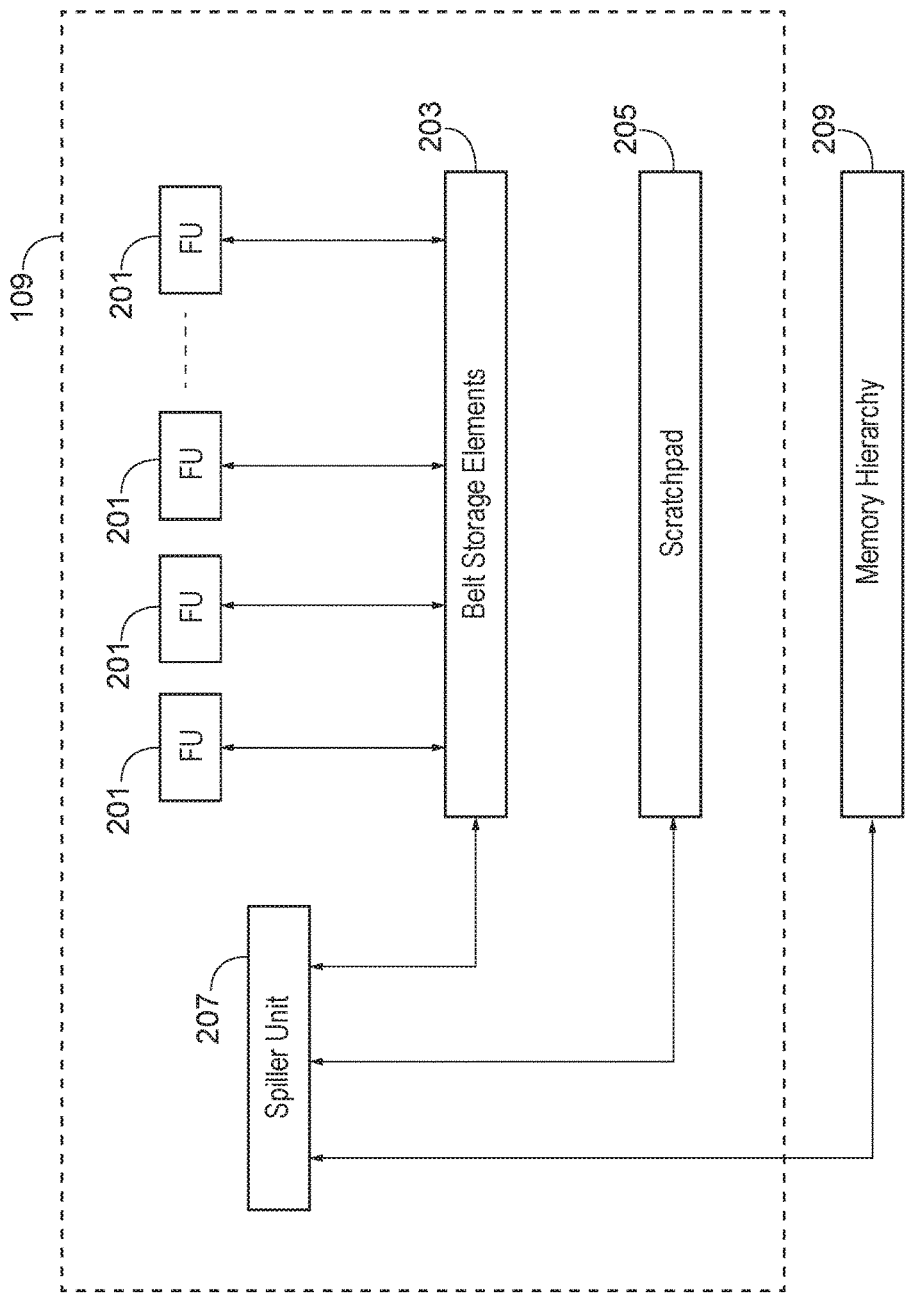
FIG. 2 is a schematic illustration of scratchpad memory and spiller unit, which can be part of the execution logic of FIG. 1A.

FIG. 2 is a schematic diagram illustrating the architecture of an illustrative embodiment of the execution logic 109 of the CPU 102 of FIG. 1 according to the present disclosure, including a number of functional units 201. The execution logic 109 also includes a set of storage elements 203 (labeled "Belt Storage Elements") that are operably coupled to the functional units 201 of the execution logic 109 and configured to store operands that are produced and referenced by the functional units of the execution logic 109. A routing network (not shown) can be used to provide physical data paths from the belt storage elements 203 to the functional units that can possibly consume the operands stored in the belt storage elements. The routing network can also provide the functionality of a bypass routing circuit (directly from a producer functional unit to a consumer function unit).

In one embodiment, the instructions processed by the processing stages of the CPU 102 view the resources of the belt storage elements 203 according to a logical program model where the storage (injection) of the result operand(s) produced by the functional units 201 acts as a fixed-length queue or conveyor belt. In this manner, the belt storage elements 203 can be viewed as a logical belt. This program model utilizes logical belt temporal addresses to explicitly refer to (or address) source operands that are accessed by a respective functional unit. The logical belt temporal addresses correspond to a pre-defined ordering scheme that reflects the temporal order in machine cycles that the result operands are produced by the functional units of the execution logic 109 as well as ordering rules with respect to operands that are produced in the same machine cycle. The operations lack any explicit reference to result operands produced by a respective functional unit. Instead, it is understood that the result operand produced by a given functional unit will be prepended to the logical belt. In other words, the result operand is added to the logical belt (or dropped onto the logical belt) at the front of the logical belt. A single operation (or multiple operations) can also produce multiple result operands in a machine cycle. The ordering rules also address this situation as if the multiple result operands were single result operands from an ordered sequence of operations. Thus, in logical space, operands are queued to (or dropped onto) the front of the belt in accordance with the order that they are produced (and in accordance with ordering rules with respect to operands that are produced at the same machine cycle), and operands fall off the rear of the belt as new operands are dropped onto the front of the belt. The logical belt temporal address of the operands shift (increment) each cycle boundary according to the number of operands to be dropped onto the front of the logical belt in the next cycle. Furthermore, operations reference the operands stored by the belt storage elements by their logical belt temporal address. Thus, an ADD operation might specify that it is to add an operand at a logical belt temporal address of 3 (i.e., the fourth most recently produced operand) to the operand at the logical belt temporal address of 7 (i.e., the eighth most recently produced operand). This is a form of temporal addressing where the logical belt temporal address is dictated by the ordinal position in the time sequence in which operands are produced.

The temporal addressing scheme of the belt storage elements can rely on a fixed number (set) of logical belt temporal addresses for storing operands. While from a logical view, the belt acts like a simple fixed-length bucket-brigade shift register for operands, and could be so implemented, any physical implementation will work so long as it permits new results operands to be stored and supplies temporally addressed operand arguments to subsequent operations.

The execution logic 109 of the CPU/Core 102 can also include an internal memory circuit dedicated to storing operands (operand data values), which is referred to herein as the scratchpad 205 as shown in FIG. 2. The scratchpad 205 can be accessed (SPILL operation) to copy an operand from the logical belt (employing logical-to-physical address mapping to access the corresponding belt storage element 203) before it is pushed off logical belt, such it can be stored for an arbitrarily long time and used for a later operation. The scratchpad 205 can also be accessed (FILL operation) to copy an operand from scratchpad 205 to the front of the logical belt (employing logical-to-physical address mapping to access the corresponding belt storage element 203) for access by subsequent operations. Thus, the FILL operation drops the result operand onto the front of the logical belt just like an ADD or any other operation. Operands are referenced at a specific position in the scratchpad 205 by a literal byte number or other unambiguous address. Furthermore, the scratchpad 205 is byte addressable (continuing its similarity to memory) and so can hold several different operands at different positions. Operands written to the scratchpad 205 may be of any supported size, and the positions occupied can be naturally aligned for that width. Thus, the given byte address for each operand is aligned on predefined boundaries within the address space of the scratchpad 205. All scratchpad addresses are static (specified at compile time), like register numbers in a general-register machine. Thus, the given byte address for each operand is statically-assigned.

The contents of the belt storage elements 203 and the scratchpad 205 can be managed by a functional unit referred to as a spiller unit 207 as shown. The spiller unit 207 is a hardware engine that is configured to save and restore processor context (including contents of the belt and possibly the scratchpad) as needed during execution by the execution logic 109.

For example, the operation of the spiller unit 207 can allow the logical belt to be configured such that it is strictly local to the current execution context across subroutine or functions calls. Thus, each subroutine or function body can have its own private logical belt. The operation of the spiller unit 207 can also allow the scratchpad 205 to be configured such that it is strictly local to the current execution context across subroutine or function calls. Thus, each subroutine or function body can have its own private scratchpad. This current execution context corresponds to a subroutine or function in the program source code, not to a thread as in other architectures. The execution logic 109 of the CPU 102 can support CALL and RETURN operations. The CALL operation is an operation (or sequence of operations) within an instruction sequence (referred to as the Caller) that directs execution to a specified subroutine or function activation (referred to as the Callee). The function frame activation is an active instance of a subroutine or function which has not yet terminated with a RETURN operation. The RETURN operation within the Callee directs execution back to the Caller. Nested CALL and RETURN operations can be used to encapsulate one frame activation within another. The semantics of the CALL operation can be embodied in a single operation or possibly be broken up into a stereotyped sequence of operations. Both cases are referred to as a CALL operation herein. Similarly, the semantics of the RETURN operation can be embodied in a single operation or possibly be broken up into a stereotyped sequence of operations. Both cases are referred to as a RETURN operation herein.

If the program code includes a CALL operation, the spiller unit 207 can be configured to save and restore processor context (including contents of the logical belt and possibly the scratchpad), and then restore the processor context when the called context executes a RETURN operation.

The logical belts can also be marked (associated) with different frame identifiers corresponding the specific CALL operations and corresponding subroutine or function frame activations that define the logical belts. In this case, the current frame number (which is assigned to the Callee function frame activation) can be derived by incrementing the frame number for the Caller function frame activation when processing the CALL operation. This frame number can be decremented when processing the RETURN operation such that the frame number then matches the Caller. Access to the logical belts can be controlled such that operations within a specific function frame activation can only access the logical belt that is tagged (associated) with the frame number that matches the specific function frame activation. In this manner, a private logical belt can be accessed by each function frame activation.

Similarly, the address space of the scratchpad 205 can be marked (associated) with the frame identifiers, and access to the scratchpad 205 can be controlled such that operations within a specific subroutine or function frame activation can only access the scratchpad access range that is tagged (associated) with the frame number matching the specific subroutine or function frame activation. In this manner, a private scratchpad is accessed by each subroutine or function frame activation. The address space of the scratchpad 205 can be managed with a window-based logical-to-physical mapping scheme to provide the private scratchpad for each function frame activation. In one embodiment, the physical address space of the scratchpad 205 can be arranged as a circular buffer and the window-based logical-to-physical mapping scheme allows access to a specific window (portion) of the circular buffer as assigned to the Callee frame identifier but hides access to the other portions of the circular buffer. In this case, the CALL operation can appear to rotate the physical address space of the circular buffer under the window, bringing the physical address space of the scratchpad assigned to the Callee frame identifier into view, and hiding the other physical address space of the scratchpad. The RETURN operation can then move the window back to its position prior to the CALL operation, bringing the physical address space of the scratchpad assigned to the Caller frame identifier into view, and hiding the other physical address space of the scratchpad.

The address space window of the scratchpad 205 that is assigned to the Callee frame identifier can have a variable size. The variable size can be dictated by an argument of a predefined operation called the SCRATCHF operation that is supported by the execution logic 109 of the CPU 102 and which can be encoded as part of a subroutine or function. The argument of the SCRATCHF operation is passed to the window-based logical-to-physical mapping scheme to define the size of the address space window of the scratchpad 205 that is assigned to the Callee frame identifier. In the event that the address space window of the scratchpad 205 that is assigned to a particular function frame activation is required to be spilled by the spiller unit 207, the size of the address space window as defined by the argument of the SCRATCHF operation can be used to save and restore only the address space window of that particular function frame activation across CALL operations. An attempt to address the scratchpad 205 beyond the allocated number can cause a fault in the executing program, analogous to addressing unallocated memory.

Note that certain operations can be in-flight when the CALL operation is executed. In this case, these operations can be allowed to complete execution and any result operand can be tagged (associated) with the frame identifier for the operation that produced the result operand. The spiller unit 205 can be configured to process the frame identifiers associated with the result operands to identify those result operands that are not produced by the operations of the Callee (which necessary includes the result operands produced by such in-flight operations) and temporarily store such result operands such that they are not added to the private logical belt for the Callee. The spiller unit 205 can be further configured to add such result operands to the private logical belt for the Caller in conjunction with the processing of the RETURN operation.

While the hardware storage of the scratchpad 205 is necessarily of fixed size, the actual utilization of that storage varies from call frame context to call frame context. The program model can provide the illusion that each new call frame context has its own complete scratchpad, saved and restored across nested calls. However, if only a part of the physical scratchpad is in actual use in a given frame then it is wasteful to save and restore the unused portion. In one embodiment, the spiller unit 207 of the execution logic 109 can employ a free-standing asynchronous save/restore engine or logic circuit which can be notified of a range of scratchpad addresses to be saved or restored, and which performs the save or restore in the background while program execution continues asynchronously. The asynchronous save/restore engine can perform the necessary saving or restoring of the scratchpad operand content in the background, without causing the program to stall, and may avoid stall entirely before execution of the active frame can resume.

In one embodiment, the spiller unit 207 of the execution logic 109 maintains two registers Base and Fence, and treats the scratchpad addresses coming from the instruction stream as logical addresses. The logical addresses are mapped to physical scratchpad addresses based upon the address stored in the Base register (which is referred to below as Base), modulo the size of the physical scratchpad (i.e. with wrap-around), and the physical addresses are then used to index the physical scratchpad to effect the access. This logical-to-physical address mapping takes place on both SPILL and FILL operations and treats the physical scratchpad 205 as a circular or ring buffer.

Details of the exemplary operations of the logical belt, the scratchpad and the spiller unit are set forth in U.S. application Ser. No. 14/312,159, U.S. application Ser. No. 14/311,988, and U.S. application Ser. No. 14/312,274, all filed on Jun. 23, 2014 and herein incorporated by reference in their entireties.

Note that the SCRATCHF operation may be executed more than once within single function frame activation. In this case, the amount of accessible scratchpad 205 for the function frame activation is increased with each SCRATCHF operation, although the total must not exceed the amount of physical scratchpad present.

Also note that the spiller unit 207 of the execution logic 109 can support a SCRATCHD operation that explicitly de-allocates space of the scratchpad 205 that has been previously allocated to a function frame activation. The SCRATCHD operation specifies a static length, which may be any value but must not exceed the amount of scratchpad currently allocated. What part of the allocated scratchpad is de-allocated can vary by design. In one embodiment, successive SCRATCHF and SCRATCHD operations can treat the allocated space as a LIFO stack, which is natural and convenient. Note that the static length of the SCRATCHD operation need not match a previously allocated length. Also, if a LIFO allocation/de-allocation strategy is adopted, the SCRATCHD operation may implicitly name the most recent remaining allocation and implicitly use its length. The effect of the explicit de-allocation that results from the SCRATCHD operation is to make the de-allocated portion of scratchpad available to the spiller unit 207, in the same way that implicit de-allocation occurs as part of a RETURN, and operands belonging to a different frame may be restored to that portion in the same way.

Rotators

Figure 3:
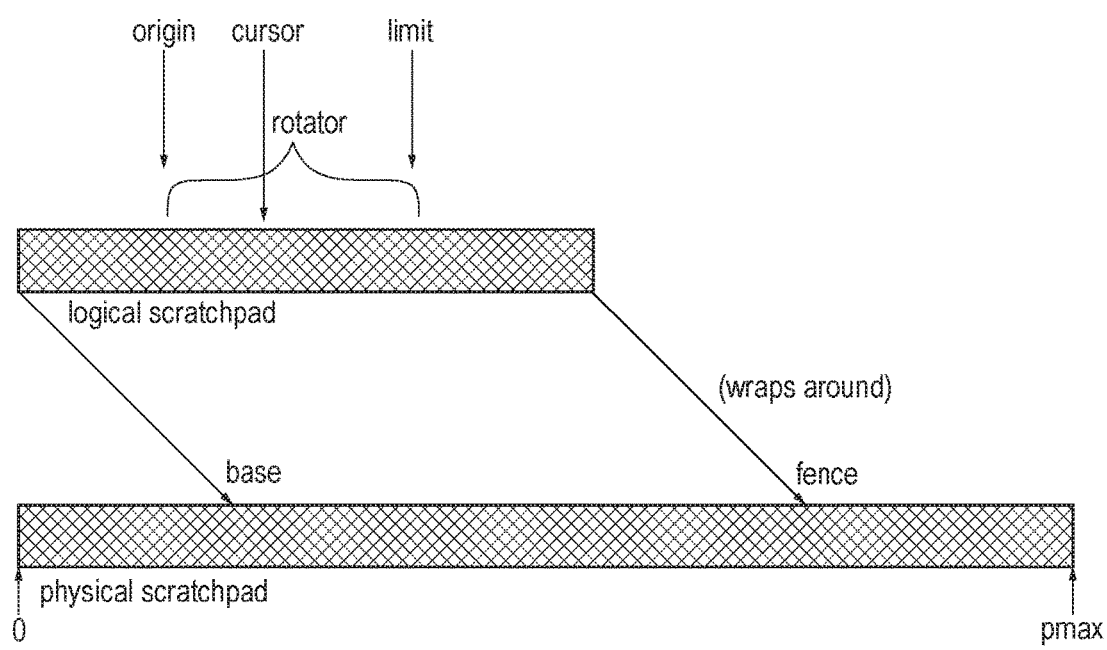
FIG. 3 is a schematic illustration of a rotator mechanism that can be used by the execution logic of FIG. 2 to manage logical-to-physical address mapping into the scratchpad memory.

The logical-to-physical address mapping from the logical address space of the scratchpad 205 to physical address space of the scratchpad 205 can be managed by one or more data structures (referred to herein as "rotators") as shown in FIG. 3. Each respective rotator contains bounds information (e.g., origin and limit values within the logical address space of the scratchpad 205) that describes the portion of the logical address space of the scratchpad 205 that is controlled by the respective rotator. The logical addresses within this logical address portion of the scratchpad 205 can be mapped to physical addresses of the scratchpad 205 in a circular manner by a cursor value that is maintained as part of the rotator.

In one embodiment, the one or more rotators can be treated as an array of fixed size from which rotators can be allocated stack-fashion following a LIFO ordering. Thus, rotator-0 can be viewed as the eldest allocated rotator, rotator-1 the next eldest allocated rotator, etc. The logical-to-physical address mapping with respect to a given logical scratchpad address (PFA) specified in a SPILL or FILL operation can involve the following steps:

First, the bound information for the allocated rotators is processed to identify the rotator that contains the given logical scratchpad address (PFA) specified in a SPILL or FILL operation;

Second, a rotator address (RA) is computed as the sum of the given logical scratchpad address (PFA) and the cursor of the rotator identified in the first step, modulo the size of the logical address space controlled by the rotator in order to support wrap-around); and Third, the scratchpad physical address is computed as the sum of the rotator address (RA) and Base, modulo the size of the physical scratchpad in order to support wrap-around.

As an example, assume that a given rotator covers positions 40-100 in the logical scratchpad, and that Base is at physical position 20 and Fence is high enough that the rotator is entirely within the allocated region. Then, with the cursor of the rotator at position 10 within its region, logical address 50 will be mapped first to rotator address 60 and that to physical address 80. The two mappings may be combined by biasing the rotator cursor by the amount of the base (i.e. to 30). Then logical address 50 maps to combined rotator/physical address 80, just as before, but with only one mapping step. All mappings, including the combined biased mapping, can allow for wraparound for the case where the rotator region and the physical scratchpad can be treated as a circular or ring buffer.

Rotators (and the regions of the logical address space of the scratchpad that they cover) can be allocated explicitly. The allocation may be implemented within a previously allocated logical scratchpad region, or, if incremental scratchpad allocation is implemented, the processing of each successive SCRATCHF operation can be configured to implicitly allocate a rotator whose region covers the newly allocated additional space of the logical scratchpad. Active allocations (those not yet de-allocated) can be treated as being nested with the eldest rotator being the outer allocation or rotator, and the youngest rotator being the inner allocation or rotator. There may be middle allocations/rotators between the inner and outer rotators. The processing of the SCRATCHD operation can be configured to disable the inner (youngest) rotator. The execution logic 109 can signal a fault if no rotators have been enabled.

Rotate Operation

The spill unit 207 of the execution logic 109 can support a ROTATE operation that specifies a static length. This static length is used to advance the cursor of the inner rotator (youngest rotator), with wraparound. Specifically, the static length specified by the ROTATE operation is added to the cursor value of the youngest rotator, modulo size of the logical address that is controlled by the youngest rotator to support wrap-around. These operations alters the logical-to-physical address mapping imposed by the inner rotator on SPILL and FILL operations that address within its region of logical scratchpad.

Extended Scratchpad

The scratchpad 205 is of fixed and limited size, but the potential need for temporary operand storage within a function frame activation is unbounded. Because the internal format of operands is not necessarily the same as the external representation of the operand data in the memory hierarchy 209, storing transient operands in the memory hierarchy 209 may cause loss of information contained in the internal form but not in the external form. The solution is the extended scratchpad, which is a region of memory hierarchy 209 that has the same capabilities and interface as the dedicated scratchpad 205 but is stored in memory hierarchy 209 (which can include the L1 Data Cache 115 and the Memory System 101).

The spill unit 207 of the execution logic 109 can support an EXSCRATCH operation (or by some other analogous method) that specifies a static length, which is used to explicitly allocate space in the memory hierarchy 209 for the extended scratchpad. The static length argument of the EXSCRATCH operation can be potentially larger than the possible lengths used when allocating the scratchpad. The operand data in the extended scratchpad are read and written by extended analogs of the SPILL and FILL operations used for scratchpad, also taking a static address which may also be larger than that permitted in the scratchpad versions of the access operations. The operand data spilled to the extended scratchpad can be in the same internal format used for both the scratchpad and the belt, and the operand data filled from the extended scratchpad can retain the internal format and value they had when spilled. As the internal format of an operand can be somewhat larger than the external (memory) format, an operand spilled to extended scratchpad may occupy more of the memory space than it would have occupied if it had been stored in external format. Such a spill or fill for the extended scratchpad may require more than one access to the memory hierarchy to complete, compared to load and stores using external format, which typically can be performed with a single access.

Each allocation of the extended scratchpad can be associated with a single function activation frame. Allocated regions of the extended scratchpad can be recovered automatically when the function frame activation of the Callee returns to its Caller, and any contents then are lost. The addressing of the extended scratchpad can be controlled by rotators analogous to those used for the scratchpad 205 as described above, if desired.

Operand Metadata

For each particular operand stored by the logical belt, the scratchpad and the extended scratchpad (if used), the operand data can include the value of a particular operand as well as associated metadata (additional information). The metadata appears in the internal representation of the operand data stored by the logical belt, the scratchpad and the extended scratchpad (if used). Such operand metadata is not stored as bytes in the normal address space of the memory hierarchy 209 (which is outside the space of the extended scratchpad in the memory hierarch 209). The operand metadata can include a variety of information, including a width-tag that indicates the scalarity and element width of the operand value, and an NaR bit that is used to indicate that the associated data reflects an error (a Not A Result, or NaR) or is missing (a None). Details of such operand metadata are described in detail in i) U.S. patent application Ser. No. 14/567,820, entitled "Computer Processor Employing Operand Data With Associated Meta-Data," filed on Dec. 11, 2014, and ii) U.S. Provisional Appl. No. 61/914,899 entitled "Improved metadata and vectorization in CPUs," filed on Dec. 11, 2013, both commonly assigned to assignee of the present application and herein incorporated by reference in their entireties.

In one embodiment, the memory hierarchy 209 can be configured to store two types of data operands that are processed (consumed and/or produced) by the execution of operations by the execution logic 109 of the CPU. The two types of data include scalar operands (or scalars) and vector operands (or vectors). Each scalar operand represents a single scalar value of some byte width. The scalar value can be of many types with a number of byte widths per type. In one illustrative example, the scalar value can be an integer type (such as an integer of 1, 2, 4, 8 or 16 bytes in width), a pointer type (such as a pointer of 8 bytes in width), a floating-point number type (such as an IEEE binary float number of 2, 4, 6 or 16 bytes in width), a decimal number type (such as an IEEE decimal number of 4, 8 or 16 bytes in width), a fraction type (such as an ISO C fraction of 1, 2, 4, 8 or 16 bytes in width), or some other scalar type. Each vector operand represents an array of scalar values of a uniform type and width. The number of scalar values in a given vector operand can also be limited to power-of-two values. The size of the vector operands can also be of some uniform size (such as 16 bytes in width) or of a variety of predefined sizes if desired.

The memory hierarchy 209 (other than the extended scratchpad) stores each scalar operand and each vector operand as consecutive bytes of data in a predefined format (referred to herein as the predefined external format). The belt storage elements 203, scratchpad 205 and extended scratchpad (if used) store the two types of data operands (scalar operands and vector operands) in a predefined format (referred to herein as the predefined internal format) that is different from the predefined external format used by the memory hierarchy 209. The execution logic 109 of the CPU can also include a number of functional units (such as one or more integer ALUs, one or more integer multipliers, one or more floating-point units, one or more branch units, one or more load/store units, and one or more vector operation units) that operate on the scalar operands and/or the vector operands in the predefined internal format as stored by the operand storage elements. The functional units can be configured to process separate operations concurrently (in parallel with one another).

For example, the execution logic 109 can possibly include one or more integer ALUs that perform twos-complement binary integer arithmetic for arithmetic and logical operations on scalar operands of supported widths. The representation of false and true, as produced by logical operations, can be binary zero and one respectively.

The execution logic 109 can further employ one or more floating-point units that support binary floating-point arithmetic utilizing IEEE-754R standard representation at 2, 4, 8 and 16 byte widths. The two-byte width can be a valid computational representation as well as the storage representation defined by the standard. The floating-point unit(s) can further support decimal floating-point arithmetic utilizing IEEE-754R standard decade representation at 4, 8 and 16 byte widths. The floating-point unit(s) can further support complex arithmetic utilizing IEEE-754R standard complex representation using either binary or decimal underlying representation, in complex widths of 8 and 16 bytes in either radix and 4 bytes in binary. The functional units can be configured to provide conversion operations to and from the standard alternate decimal representation as well as conversion operations to and from binary floating-point representation.

The execution logic 109 can further employ one or more integer adders and one or more integer multipliers that support fixed-point (integer) arithmetic uses C00X standard representation for both fixed-point and fraction types.

The functional units of the execution logic 109 can perform addressing arithmetic utilizing pointers (addresses) that occupy 8 bytes. The pointers can be configured to address a global virtual address space of $2^{60}$ bytes, address a per-process local address space of $2^{60}$ bytes, and have support for garbage collected memory.

The functional units of the execution logic 109 can support predicated operations that examine only the least significant bit of their predicate arguments. The functional units of the execution logic 109 can be configured to have no preference for signed versus or unsigned data, and the signed-ness of the character type may be freely chosen by the programming language or software.

Scalar Operand Data Elements

Each given scalar operand that is processed by the execution logic 109 (either consumed as an argument of an operation or produced as a result of an operation), which is referred to as a "scalar operand data element" herein, includes payload data that is physically associated with meta-data according to a predefined internal format as described in U.S. patent application Ser. No. 14/567,820, entitled "Computer Processor Employing Operand Data With Associated Meta-Data," filed on Dec. 11, 2014, incorporated by reference above in its entirety. For a valid scalar operand data element (which is not a NAR and None type as described below), the payload data represents the value of a scalar operand having a predefined number of bytes (byte-width) that is a power of two. The meta-data can include a tag (labeled as "scalarity tag") with two parts: i) a bit (labeled scalar or vector) whose binary value indicates that the associated payload data represents a scalar operand (as opposed to a binary value that the associated payload data represents a vector operand), and ii) an element width field whose value represents the pre-defined number of bytes (power-of-two byte-width) of the associated payload data.

The meta-data of the scalar operand data element can further include a not-a-result (NAR) bit. The NAR bit indicates whether the associated payload data is valid or reflects a previously detected error. If the NAR bit indicates that the payload data is valid, the associated payload data represents the value of a scalar operand having a predefined number of bytes (byte-width) that corresponds to the element width field of the meta-data tag. The errors reflected by the NAR bit can include i) memory access violations, such as when a LOAD operation addresses a memory location for which the program does not have access permission; ii) any one of many operations for which integer overflow is possible, when using the form of the operation which treats overflow as an error; and iii) a floating-point operation that generates a NaN signal (per the IEEE standard) when the CPU is set to treat the NaN signal as errors. If the NAR bit indicates that the payload data reflects a previously detected error, the associated payload data can provide useful debugging information. For example, such debugging information can include a KIND field that reflects the nature of the original error and a WHERE field that provides some indication of where in the program the error took place. The WHERE field can possibly include the value of (or a hash of) the program counter value for the instruction that first created the error.

For each given scalar operand data element that represents a floating-point number, the meta-data of the given scalar operand data element can further include a set of Boolean exception flags (or FP flags). The FP flags are implicit output arguments to all floating-point operations and correspond to error conditions that relate to the floating-point number of the scalar operand data element. For example, a set of five FP flags can represent the following error conditions that relate to the floating-point number of the scalar operand data element: i) a divide by zero error condition, ii) an inexact error condition, iii) an invalid error condition, iv) an underflow error condition, and v) an overflow error condition.

Scalar operand data elements that employ the NAR bit to indicate that the payload data reflects a previously detected error are referred to as scalar NARs herein. Such scalar NARs are useful where the execution logic 109 of the CPU performs speculation. Speculation is an optimization technique employed by the CPU where the CPU can possibly perform some operations that may not be actually needed. The main idea is to do work before it is known whether that work will be needed at all, so as to prevent a delay that would have to be incurred by doing the work after it is known whether it is needed. If it turns out the work was not needed after all, any changes made by the work are reverted and the results are ignored. Speculation can involve going down one path in a code sequence and then if wrong discarding the results down this one path and executing the other path. Speculation can also involve going down all paths of execution in a code sequence and choosing the right result after the fact and then discarding the results down the wrong path(s). Speculation can also involve starting operations before it is known whether such operations will be needed at all. Speculation involves the speculative execution of speculable operations—an operation that can be speculatively executed without side effects to the logical program order (such as data hazards, structural hazards, and control or branching hazards). Speculation does not involve non-speculable operations—an operation that produces side effects to the logical program order (such as data hazards, structural hazards, and control or branching hazards) when speculatively executed. Furthermore, the detection of an error condition in the execution of a non-speculable operation produces a fault which requires special handling by the CPU in a manner deemed appropriate by the system designer. Non-speculable operations can include control flow operations such as CONDITIONAL BRANCH operations that cannot handle a scalar NAR as the control predicate value. That is, if the branch is to be taken if a value is true and not taken if it is false, what should the branch do if the value is a NAR? Non-speculable operations can also include STORE operations where the address of the STORE operation is derived from a scalar NAR or where the value to be stored is a scalar NAR. In the case where the address of the STORE operation is derived from a scalar NAR, it is quite impossible to decide what location should be updated with the stored value. It is also contemplated that STORE operations can be speculable in nature. In this case, the speculation can buffer the corresponding store request (for example, by adding control bits to a write buffer) and not complete the buffered store request until the condition being speculated on is resolved. The operation that updates the speculation hardware (e.g., the control bits of the write buffer) upon resolving the condition being speculated on is non-speculable in nature. Note that when the CPU has speculatively executed operations that are not on the control path eventually taken, then the results of those mis-speculatively executed operations must be discarded.

Note that speculable operations can follow down a path through multiple branches, but the respective BRANCH operations are not speculable. In this case, the operations down the path are lifted to in front of the BRANCH operation and so are executed before we get to the branch operation. After the BRANCH operation, the non-speculable operations of the chosen path (which were not, and cannot be, lifted to in front of the branch) will be executed and will use the speculated results of the chose path. The speculated results of the non-taken path are discarded.

In such a system, when a functional unit of the execution logic 109 performs speculative execution of a speculable operation that involves one or more scalar operand data elements, the functional unit is adapted to check whether any input scalar operand data element that is supplied to the functional unit is a scalar NAR. If so, the functional unit is adapted to bypass the normal processing and produce a scalar NAR result, which is typically the same NAR value as the scalar NAR input. Consequently, the presence of a scalar NAR input during speculation indicates that an error condition occurred somewhere in the computation history leading to the input, and this error condition is passed down the speculated control path.

However, when a functional unit of the execution logic 109 executes a non-speculable operation that involves one or more scalar operand data elements, the functional unit is adapted to check whether any input scalar operand data element that is supplied to the functional unit is a scalar NAR. If so, the functional unit is adapted to bypass the normal processing and trigger the CPU to raise a fault, which is specially handled by the CPU in a manner deemed appropriate by the system designer.

Note that scalar NARs can be discarded like ordinary mis-speculated results, and the error condition does not have to be unwound. Furthermore, the use of the scalar NAR allows more kinds of operations to be speculable, and consequently greatly increases the chance that otherwise idle machine resources can be utilized by speculated computations which will often have actual utility.

Furthermore, the payload data of the scalar NAR can provide useful debugging information (such as the KIND field and WHERE field as described above). Thus, in the event that the scalar NAR is processed by speculative execution of a non-speculable operation and triggers error handling as described above, the payload data of the scalar NAR can be made available to programming tools such as a debugger to provide useful information to the programmer so that the error can be corrected at the point where it occurred.

The payload data and the meta-data of the scalar operand data element can also be used to define a unique data value (called a None) that can be distinguished from the ordinary results of computations. The None value is used to represent that data is missing and the operation on the missing data can be ignored. In one embodiment, the representation of the None can be similar to the NAR operand data element except for a difference in the KIND field of the payload element that distinguishes the None from the NAR operand data. None can be used during speculation. More specifically, when a functional unit of the execution logic 109 performs speculative execution of a speculable operation that involves one or more scalar operand data elements, the functional unit is adapted to check whether any input scalar operand data element that is supplied to the functional unit is a None. If so, the functional unit is adapted to bypass the normal processing and produce a scalar None result, which is typically the same None value as the scalar None input. Consequently, the presence of a scalar None input during speculation is passed down the speculated control path.

However, when a functional unit of the execution logic 109 executes a non-speculable operation that involves one or more scalar operand data elements and that updates the machine state (for example a store to memory or a write to a register), the functional unit is adapted to check whether any input scalar operand data element that is supplied to the functional unit is a None. If so, the functional unit is adapted to bypass the normal processing and simply skip the update operation. Note that any operation with a mix of scalar None and NAR arguments can be configured to behave as if only the scalar None is present.

Note that scalar None data element can be used without the support for the scalar NAR. For example, an implementation might choose a machine representation that combines a parity error (to distinguish it from ordinary data) and a particular bit pattern (to distinguish it from actual parity errors). The implementation must also provide means to make the scalar None value available to the program, for example in a dedicated register. Lastly, any machine operation that updates the machine state (for example a store to memory) must detect the presence of a scalar None and skip the update.

The scalar operand data elements that represent floating-point numbers and associated FP flags as part of the meta-data are also useful for speculation. Specifically, when a functional unit of the execution logic 109 performs speculative execution of a speculable operation that involves such a floating-point scalar operand data element (such as an intermediate or final floating-point computation), the functional unit is adapted to annotate the resultant floating-point scalar operand data element with a set of FP flags derived from the logical OR of the FP flags that are associated with the input argument floating-point scalar operand data element(s) as well as those FP flags resulting from any exceptions detected during the speculative execution of such speculable operation. Consequently, the FP flags associated with each given floating-point scalar operand data element reflects the exception history of the prior computation(s) that led to the given floating-point scalar operand data element. Such FP flag metadata is carried through all operations that can be speculated. However, when a functional unit of the execution logic 109 performs a non-speculable operation that involves such a floating-point scalar operand data element and updates the machine state (for example a store to memory or a write to a register), the functional unit can be adapted to update a global set of FP flags for future use by the program.

Vector Operand Data Elements

Each given vector operand that is processed by the CPU 102 (either consumed as an argument of an operation or produced as a result of an operation), which is referred to as a "vector operand data element" herein, includes a number of scalar payload data elements that are physically associated with meta-data according to a predefined internal format as described in U.S. patent application Ser. No. 14/567,820, entitled "Computer Processor Employing Operand Data With Associated Meta-Data," filed on Dec. 11, 2014, incorporated by reference above in its entirety. The representation and behavior of the scalar elements of the vector operand data element can be similar to that of a single scalar operand data element. For each valid scalar value that is part of the vector operand (which is not a NAR and None type as described above), the respective payload data elements each represents the value of a scalar operand having a predefined number of bytes (byte-width) that is a power of two. The total number of bytes of the number of scalar operands represented by the vector operand data element can be fixed by design. In one example, the total number of bytes of the number of scalar operands represented by the vector operand data element is fixed at 128 bytes. In this case, the predefined number of bytes of the scalar operands and the total number of bytes of such scalar operands of the vector operand data element dictates the number of scalar operands represented by the vector operand data element. The meta-data of the vector operand data element can include a tag (labeled as "scalarity tag") with two parts: i) a bit whose binary value indicates that the associated payload data elements represents a vector operand (as opposed to a binary value that indicates that associated payload data represents a scalar operand), and ii) an element width field whose value represents the pre-defined number of bytes (power-of-two byte-width) of the associated payload data elements of the vector operand data.

The meta-data of the vector operand data element can further include a not-a-result (NAR) bit for each payload data element. The NAR bit indicates whether the associated payload data element is valid or reflects a previously detected error. If the NAR bit indicates that the corresponding payload data element reflects a previously detected error (e.g., it is a NAR as described above), the associated payload data element can provide useful debugging information. For example, such debugging information can include a KIND field that reflects the nature of the original error and a WHERE field that provides some indication of where in the program the error took place as described above. The WHERE field can possibly include the value of (or a hash of) the program counter value for the instruction that first created the error.

For each given vector payload data element that represents a floating-point number, the meta-data of the associated payload data element can further include a set of Boolean exception flags (or FP flags). The FP flags are implicit output arguments to all floating-point operations and correspond to error conditions that relate to the floating-point number of the corresponding vector payload data element. For example, a set of five FP flags can represent the following error conditions that relate to the floating-point number of the corresponding vector payload data element: i) a divide by zero error condition, ii) an inexact error condition, iii) an invalid error condition, iv) an underflow error condition, and v) an overflow error condition.

The vector operand data elements that employ the NAR bit to indicate that the corresponding vector payload data element reflects a previously detected error are referred to as vector NARs herein. Such vector NARs are useful where the CPU performs speculation as described above.

In such a system, when a functional unit of the execution logic 109 performs speculative execution of a speculable operation that involves one or more vector operand data elements, the functional unit is adapted to check whether any input vector operand data element that is supplied to the functional unit is a vector NAR. If so, the functional unit is adapted to bypass the normal processing for each NAR payload element of the input vector operand data element(s) and produce a result vector operand data element with corresponding NAR payload elements. Note that the other vector operand data elements (other than the two pairs with a NAR payload element) are processed as normal (no bypass) to produce a corresponding payload element in the result vector operand data element. Consequently, the presence of a vector NAR input during speculation indicates that an error condition occurred somewhere in the computation history for the vector input, and this error condition is passed down the speculated control path.

However, when a functional unit of the execution logic 109 executes a non-speculable operation that involves one or more vector operands data elements, the functional unit is adapted to check whether any input vector operand data element that is supplied to the functional unit is a vector NAR. If so, the functional unit is adapted to bypass the normal processing and trigger the CPU to raise a fault, which is specially handled by the CPU in a manner deemed appropriate by the system designer. Non-speculable operations on vector operands can include STORE operations where the address of the STORE operation is derived from a NAR or where the vector operand value to be stored includes a NAR.

Note that the one or more NAR payload elements that are part of a vector NAR can be discarded like ordinary mis-speculated results, and the error condition does not have to be unwound. Furthermore, the use of the vector NAR allows more kinds of operations to be speculable, and consequently greatly increases the chance that otherwise idle machine resources can be utilized by speculated computations which will often have actual utility.

Furthermore, the NAR payload element(s) that are part of the vector NAR can provide useful debugging information (such as the KIND field and WHERE field as described above with respect). Thus, in the event that the vector NAR is processed by execution of a non-speculable operation and triggers error handling as described above, the NAR payload element(s) that are part of the vector NAR can be made available to programming tools such as a debugger to provide useful information to the programmer so that the error can be corrected at the point where it occurred.

The payload data elements and the corresponding meta-data of the vector operand data element can also be used to define a unique data value (called a None) for one or more of such payload elements. Similar to the scalar None, the None value is used to represent that the payload data element of the vector operand data element is missing and the operation on the missing payload data element can be ignored. In one embodiment, the representation of the None payload data element of the vector operand can be similar to the NAR payload data element except for a difference in the KIND field of the payload data element that distinguishes the None from the NAR operand data. None payload data elements as part of a vector operand data element can be used during speculation.

More specifically, when a functional unit of the execution logic 109 performs speculative execution of a speculable operation that involves at least one vector operand, the functional unit is adapted to check whether any input vector operand data element that is supplied to the functional unit includes one or more None payload data elements. If so, the functional unit is adapted to bypass the normal processing for each None payload element of the input vector operand data element(s) and produce a result vector operand data element with corresponding None payload element(s). Note that the other vector operand data elements (other than the respective pairs with a None payload element) are processed as normal (no bypass) to produce a corresponding payload element in the result vector operand data element. Consequently, the presence of one or more None payload data elements in the input vector operand data elements input are passed down the speculated control path.

However, when a functional unit of the execution logic 109 executes a non-speculable operation that involves one or more vector data operand elements and that updates the machine state (for example a STORE to memory or a LOAD operation from memory), the functional unit is adapted to check whether any input vector operand data element that is supplied to the functional unit includes one or more None payload data elements. If so, the functional unit is adapted to bypass the normal processing for each None payload element of the input vector operand data element(s) and simply skip the update operation for the operand data element.

Note that any operation with a mix of vector None and vector NAR arguments can be configured to behave as if only the vector None is present. Also note that vector None payload elements can be used without the support for the vector NAR. For example, an implementation might choose a machine representation that combines a parity error (to distinguish it from ordinary data) and a particular bit pattern (to distinguish it from actual parity errors). The implementation must also provide means to make the vector None payload elements available to the program, for example in one or more dedicated registers. Lastly, any machine operation that updates the machine state (for example a store to memory) must detect the presence of the vector None payload elements and skip the update of the vector None payload elements.

The vector operand data elements that represent floating-point numbers and associated FP flags as part of the meta-data are also useful for speculation. Specifically, when a functional unit of the execution logic 109 performs speculative execution of a speculable operation that involves such a floating-point vector operand data element (such as an intermediate or final floating-point computation), the functional unit is adapted to annotate the FP flags as part of the meta-data fields for the resultant floating-point vector operand data element with a set of FP flags derived from the logical OR of the FP flags that are associated with the input argument floating-point payload data element(s) as well as those FP flags resulting from any exceptions detected during the speculative execution of such speculable vector operation. Consequently, the FP flags associated with each given floating-point payload data element reflects the exception history of the prior computation(s) that led to the given floating-point payload data element. Such FP flag metadata is carried through all operations that can be speculated. However, when a functional unit of the execution logic 109 performs a non-speculable operation that involves such a floating-point vector operand data element and updates the machine state (for example a STORE operation to memory or a LOAD operation from memory), the functional unit can be adapted to update a global set of the FP flags for the payload data elements of the result vector operand for future use by the program.

Also note that the meta-data of an operand data element can be used to encode an undefined width-tag for the operand data element, which indicates that the operand data element has no defined scalarity or element width. When such an operand data element is used as an argument to an operation, it can be treated as if it were a None of a scalarity and element width determined by the nature of the operation. In this case, the scalarity and width of the operand data element can be chosen from one that is valid for the operation given the scalarity and width of the other arguments. If application of this rule is ambiguous then a default scalarity and width can be used, such as a scalar None of word (four byte) width. Conversion of an undefined operand data element to an appropriately-sized None is called promotion of the undefined operation. The specification of the undefined operand can also be indicated by means other than a width-tag encoding. For example, there may be a distinct metadata bit to indicate undefinedness. Regardless of how undefinedness is indicated, promotion results in a None operation argument of defined scalarity and element width as defined by the promotion rule.

RETIRE Operation

The execution logic 109 can support a RETIRE operation that specifies an integer value of zero or more as depicted in FIG. 4. The specified integer value represents a static count of operands that are asserted to drop onto the front of the logical belt in the machine cycle in which RETIRE operation executes (or possibly in a different cycle convenient to the implementation). In essence, the specified integer value represents a static count of operand data values that is intended to be retired (e.g., dropped onto the logical belt) in the machine cycle in which RETIRE operation executes (or possibly in a different predefined machine cycle convenient to the implementation). In processing the RETIRE operation, the execution logic 109 compares the specified integer value with the number of operands that are retired (e.g., dropped onto the logical belt) as a result of other operations (other than the RETIRE operation) in the machine cycle in which RETIRE operation executes (or possibly in a different cycle convenient to the implementation). If the specified integer value is greater than the number of operands that are retired (e.g., dropped onto the logical belt) as a result of such other operations, then the execution logic 109 retires sufficient None operand data elements of undefined width and scalarity (e.g., drops such None operand data elements onto the logical belt) to bring the total operand retirement count (e.g., the actual drop count onto the logical belt) to equal the specified integer value for that machine cycle. Example A and Example B of FIG. 5A describes these operations. If the specified integer value and the number of operands that are retired (e.g., dropped onto the logical belt) by such other operations are equal, then the RETIRE operation performs as a no-op. Example C of FIG. 5B describes these operations. If the specified integer value is less than the number of operands that are retired (e.g., dropped onto the logical belt) by such other operations, then the execution logic 109 signals a machine fault by whatever mechanism the implementation uses to indicate an error condition. Example D of FIG. 5B describes these operations.

It is not meaningful for a single instruction to contain more than one RETIRE operation. Furthermore, predefined ordering rules can be used to define the relative ordering between operand drops onto the front of the logical belt that result from the RETIRE operation (if any) and operand drops onto the front of the logical belt from other operations within the same machine cycle. For example, in one embodiment, the operand drops onto the front of the logical belt that result from the RETIRE operation (if any) are positioned on the front of the logical belt ahead of the operand drops onto the front of the logical belt from other operations in the same machine cycle. In this configuration, the operand drops onto the front of the logical belt that result from the RETIRE operation appear as operand drops resulting from longer latency operations. Specifically, the belt drop order is such that operands dropped onto the front of the logical belt by longer latency operations in the machine cycle appear at lower belt positions than operands dropped onto the front of the logical belt by shorter latency operations. Thus, the operands dropped onto the front of the logical belt as a result of the RETIRE operation will appear at lower belt positions, and vice versa.

RETIRE WITH WIDTH LIST Operation

The execution logic 109 can also support a RETIRE WITH WIDTH LIST operation that specifies a list of scalarity and element width pairs, hereinafter tags. The number of tags in the list corresponds to the integer value specified by the RETIRE operation as described above. This list of tags is used for validity checks and to determine how many operand drops should result from the RETIRE WITH WIDTH LIST operation, in a similar manner as the RETIRE operation as described above. However, instead of retiring None operands of undefined-width operands (i.e., dropping such undefined None operands onto the front of the logical belt) where applicable, this operation retires None operands of the respective scalarity and element width as given in the tag list (e.g., by dropping such None operands onto the front of the logical belt) where applicable. When the number of operands retired by the other operations drops is not zero, the corresponding list tags optionally may be compared with the width-tag of the retired operands to confirm that the actual retired operands are of the expected scalarity and element width, with an error condition indicated if there is a mismatch.

Note that the RETIRE operation as described above has a more compact encoding than the RETIRE WITH WIDTH LIST operation and can be preferred if the promotion behavior of undefined-width operands results in the desired scalarity and element width.

INNER Operation

The execution logic 109 can also support an INNER operation which is used to initiate a loop. The execution of the INNER operation is similar to that of the CALL operation and the semantics are identical, except that the loop entered by the INNER operation does not receive a new empty function frame activation or a new empty scratchpad. Instead the function frame activation and scratchpad defined prior to execution of the INNER operation remain accessible after the execution of the INNER operation, with the same contents.

Execution of the INNER operation is said to create a loop frame, by analogy with the call frame created by the CALL operation. The loop frame receives a new, empty logical belt, initialized with the arguments specified as part of the INNER operation just as the new logical belt in a call frame is initialized with the arguments specified by the CALL operation. Any computations that are in-flight when the INNER operation is executed are saved across the loop.

LEAVE Operation

The execution logic 109 can also support a LEAVE operation, which is used to exit a loop frame. The execution of the LEAVE operation is similar to that of the RETURN operation and the semantics are identical, except for not restoring the call frame nor the scratchpad as both the call frame and the scratchpad are not saved or disturbed by the corresponding INNER operation.

The LEAVE operation restores the logical belt to its state and contents as existed when the corresponding INNER operation was executed, and then drops the arguments specified as part of the LEAVE operation onto the front of the restored logical belt exactly as the RETURN operation drops its arguments. Any in-flight computation that had been saved as a result of the execution of the corresponding INNER operation are also dropped onto the front of the logical belt after the LEAVE operation, with the same latency and timing as if the entire INNER/LEAVE sequence had been a single simple operation, again just as is done for the RETURN operation.

Any computation that was initiated within the loop frame but is still in flight is discarded when the LEAVE operation is executed. It does not drop to the logical belt.

The LEAVE operation may interact with the SCRATCHF operation. One possibility is to have any scratchpad allocation (such as by one or more SCRATCHF operations) within a loop frame be automatically de-allocated by the execution of the LEAVE operation. Alternatively, explicit de-allocation (such as by the SCRATCHD operation) may be required, or de-allocation may be under program control through use of some combination of variants to the LEAVE operation or arguments to it.

LEAVE operations are paired with matching INNER operations. An attempt to LEAVE a loop frame that has not been entered by a matching INNER is a fault to be reported to the exception handling machinery of the CPU.

As an alternative, the LEAVE operation may be omitted from the instruction set, and thus not supported by the execution logic 109. Instead, the RETURN operation can be used for this purpose. In this case, if there are open loop frames, then the RETURN operation exits the innermost loop frame, and if there are no open loop frames then the RETURN operation exits the current function frame activation.

Compiler that Uses the CPU Architectural Enhancements for Software Pipelining

A compiler is a computer program that transforms a source computer program written in one language (such as C++, C, Java, etc.) into a target computer program that has the same meaning but is written in another language, such as an assembler or machine language, which is specific to the instruction set architecture of a target CPU or a target class of CPUs. A compiler's tasks may be divided into an analysis stage followed by a synthesis stage, as explained in Compilers: Principles, Techniques, and Tools by A. Aho et al. (Addison Wesley, 1988) pp. 2-22. The product of the analysis stage may be thought of as an intermediate representation of the source program; i.e., a representation in which lexical, syntactic, and semantic evaluations and transformations have been performed to make the source code easier to synthesize. The synthesis stage may be considered to consist of two tasks: code optimization, in which the goal is generally to increase the speed of execution of the target program, or possibly to decrease the amount of resources required to execute the target program; and code generation, in which the goal is to actually generate the target code program.

A compiler that is particularly well suited to one or more aspects of the code optimization task may be referred to as an "optimizing compiler." Optimizing compilers are of increasing importance for several reasons. First, the work of an optimizing compiler frees programmers from undue concerns regarding the efficiency of the high-level programming code that they write. Instead, the programmers can focus on high-level program constructs and on ensuring that errors in program design or implementation are avoided. Second, designers of computers that are to employ optimizing compilers can configure hardware based on parameters dictated by the optimization process rather than by the non-optimized output of a compiled high-level language. Third, increased use of microprocessors that are designed for instruction level parallel processing, such as RISC and VLIW microprocessors, presents new opportunities to exploit this processing through a balancing of instruction level scheduling and register allocation.

There are various strategies that an optimizing compiler may pursue. Many of them are described in S. Muchnick, Advanced Compiler Design and Implementation (Morgan Kaufmann Publishers, 1997). One large group of these strategies focus on optimizing transformations, such as are described in D. Bacon et al., "Compiler Transformations for High-Performance Computing," in ACM Computing Surveys, Vol. 26, No. 4 (December 1994) at pp. 345-520. These transformations often involve high-level, machine-independent, programming operations: for example, removing redundant operations, simplifying arithmetic expressions, removing code that will never be executed, removing invariant computations from loops, and storing values of common sub-expressions rather than repeatedly computing them. These machine-independent transformations are hereafter referred to as high level optimizations.

Other strategies employ machine-dependent transformations. These machine-dependent transformations are hereafter referred to as low level optimizations. Two important types of low level optimizations are: (a) instruction scheduling and (b) allocation of resources that store transient operands. An important portion of both types of low level optimization strategies are focused on loops in the code, where in many applications the majority of execution time is spent.

A principal goal of some instruction scheduling strategies is to permit two or more operations to be executed in parallel, a process referred to as instruction level parallel (ILP) processing. One known technique for improving instruction level parallelism in loops is referred to as software pipelining Software pipelining parallelizes a loop by overlapping the execution of different iterations of the loop.

A loop is an iterative construct in which a sequence of instructions (i.e., a portion of code) is executed repeatedly, either for a fixed number of times (a count-loop), until a terminating condition is satisfied (a while-loop), or indefinitely (a non-terminating loop). Loops mat have more than one exit condition, including a mix of count-based and while-based condition, with exit occurring whenever any of the conditions is satisfied.

A loop body comprises the instructions that are repeatedly executed by a loop.

An iteration is one execution of the loop body. Count loops have a fixed number of iterations, while loops have a variable number of iterations, and non-terminating loops have an unbounded number of iterations.

An exit is the act of ceasing to iterate and continue execution of instructions outside the loop.

A control variable is a datum that takes on a different value with each iteration. Commonly the sequence of values of a control variable form a linear recurrence, in which the difference between successive values of the control variable is some fixed quantity called the stride.

A predicate comprises the instructions that test the terminating condition of a while-loop.

A loop head comprises the instructions that prepare and advance the loop from one iteration to the next. For a while-loop, the head will include evaluating the predicate. For a loop with control variables the head will include determining the next value for each variable and setting the variable values accordingly.

A loop-carried variable is a datum whose value is defined in one iteration but used in a subsequent iteration.

Figure 9:
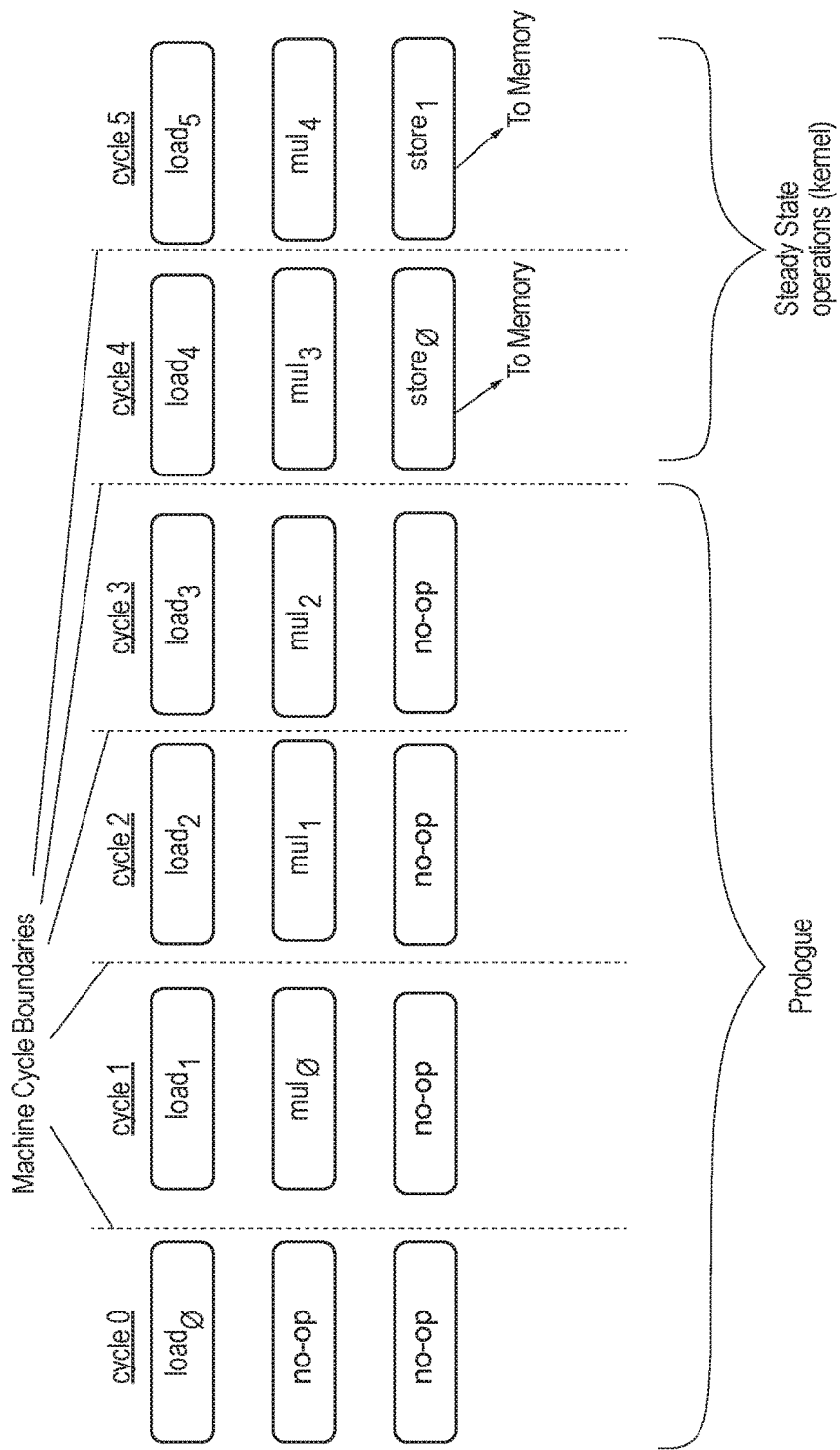
FIG. 9 is a schematic illustration of prior-art software pipelining techniques that use a prologue to implement the exemplary loop of FIG. 6.

A loop transformed by software pipelining (a software-pipelined loop) can include three phases: a prologue, a kernel, and an epilogue. The prologue fills the pipeline of stages that execute the loop—i.e., new iterations are commenced and no iterations are complete. The kernel is where the pipeline of stages that execute the loop is in steady state—i.e., new iterations are commenced and older iterations are completed. The epilogue is where the pipeline of stages that execute the loop is drained—i.e., no new iterations are commenced and old iterations are completed. FIG. 9 shows the prologue and kernel for an exemplary software-pipelined loop for the source code of FIG. 6. In this example, it is given that the execution latency of the LOAD operation is one (1) machine cycle and the execution latency of the MULTIPLY operation is three (3) machine cycles.

In one embodiment, the compiler can be configured to carry out software pipelining in a manner that uses the RETIRE operation and/or the RETIRE WITH WIDTH LIST operation as well as operands with the semantics of the None operand so as to avoid the need for a prologue in the resulting software pipelined loop. This avoids fetching and storing the prologue into the memory hierarchy, which saves code space and such code space can be a significant constraint in the big loops with low iteration counts typical of general-purpose code. Specifically, the instruction at the loop head can be configured to contain a RETIRE operation (or the RETIRE WITH WIDTH LIST operation) whose specified count matches the expected count of operands retired (e.g., dropped on the logical belt) by other operations of the loop head when the loop is in steady state. This construct allows the loop to be entered directly without a prologue to build up to the steady state. Specifically, the execution of the RETIRE operation (or the execution of the RETIRE WITH WIDTH LIST operation) retires None operands (e.g., by dropping None operands onto the front of the logical belt) for operand values that have not yet been calculated when the loop is first entered, but does not do so and performs a no-op when such operand values are present in the steady state. The semantics of the None operand ensure that the operations that would have used those values are free of side effects. As the loop is iterated, more and more of the actual transient result operands are retired (e.g., dropped onto the logical belt) when control returns to the loop head, and the number of None operands dropped by the RETIRE operation (or the RETIRE WITH WIDTH LIST operation) diminishes, until steady state is reached and the retirement of all expected operands occurs and the RETIRE operation (or the RETIRE WITH WIDTH LIST operation) becomes a no-op.

An example of such software pipelining is illustrated in FIGS. 6 and 7A to 7E.

Figure 6:
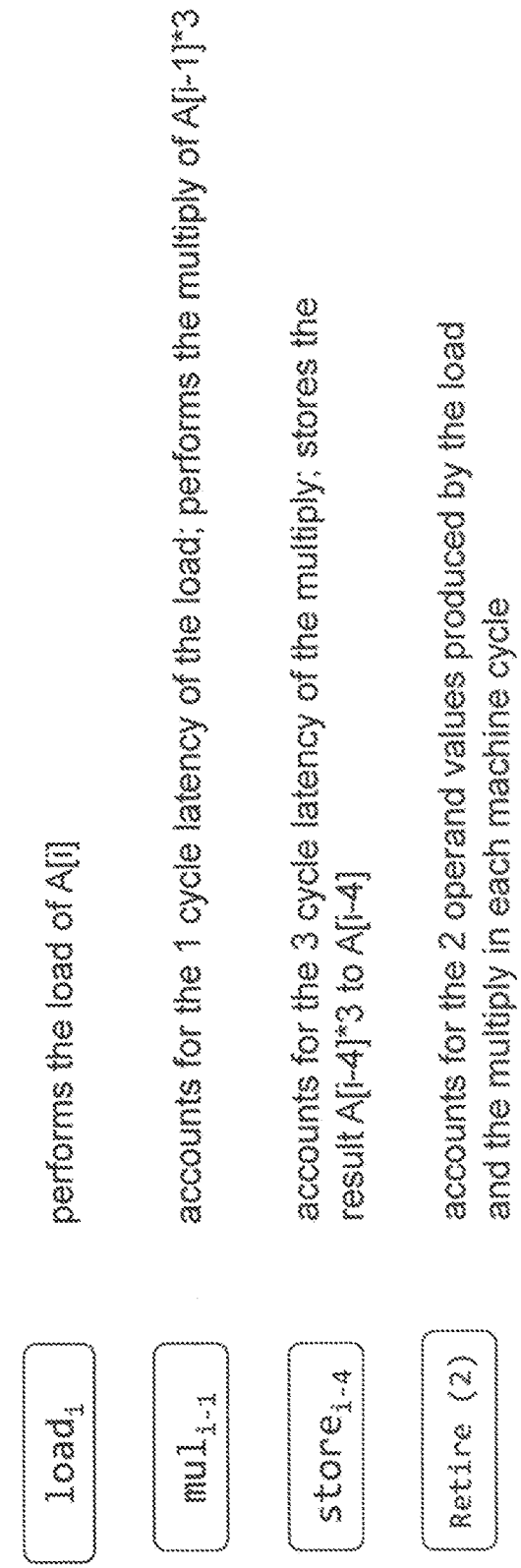
FIG. 6 shows the source code for an exemplary loop along with the per cycle steady state operations for each iteration of the loop.

FIG. 6 shows the source code for an exemplary loop along with the per cycle steady state operations for each iteration of the loop. The operation labeled "$load_i$" performs the LOAD operation of A[i]. The operation labeled "$mult_{i-1}$" performs the MULTIPLY operation of A[i-1]*3. The operation labeled "$store_{i-4}$" performs the STORE operation that stores the result of A[i-4]*3 to A[i-4]. The operation labeled "retire" specifies a count value of two (2) that matches the expected count of operands to retire (e.g., by dropping such operands onto the logical belt) by other operations of the loop head (i.e., the MULTIPLY and STORE operations) for the per-cycle steady state operations of the loop. In this example, it is given that the execution latency of the LOAD operation is one (1) machine cycle and the execution latency of the MULTIPLY operation is three (3) machine cycles.

Figure 7A:
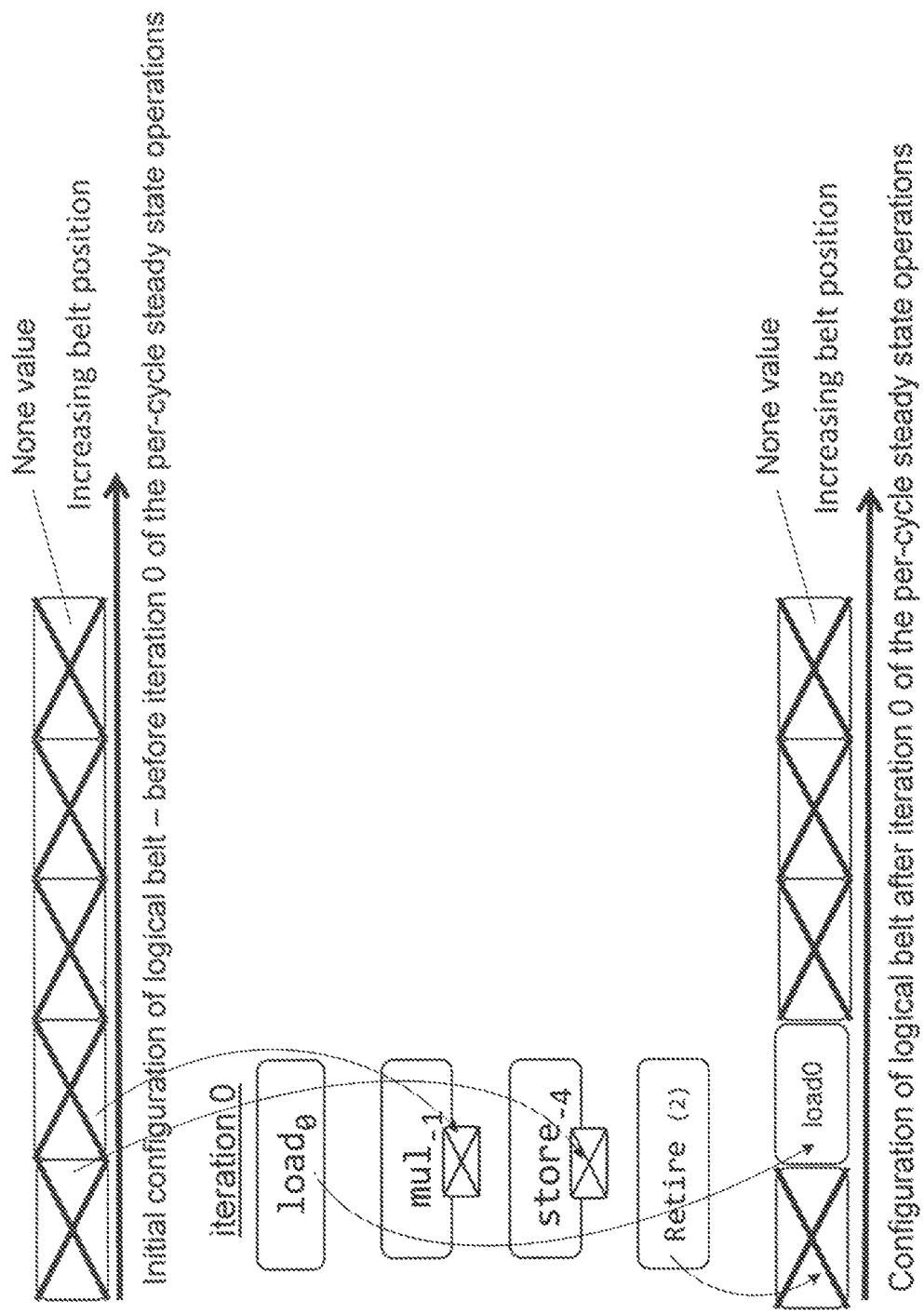
FIGS. 7A to 7E are schematic illustrations of software pipelining techniques that implement the first five iterations of the exemplary loop of FIG. 6 using a retire operation as part of the loop head in order to omit any prologue for the loop.

The top part of FIG. 7A shows the initial configuration of the logical belt before the first iteration (iteration 0) of the per-cycle steady state operations where all of the belt storage elements are configured to store None operand data values. The middle part of FIG. 7A depicts the first iteration (iteration 0) of the per-cycle steady state operations where the operand data value resulting from the "$load_0$" operation along with one None operand data value resulting from the "RETIRE" operation are retired (e.g., dropped onto the logical belt). The None operand data value resulting from the "RETIRE" operation can be dropped onto the front of the logical belt in a belt position just in front of the operand data value resulting from the "$load_0$" operation a shown. The "$mul_{-1}$" operation is supplied with a None operand data value from the logical belt and does not produce any result in this machine cycle due to the three (3) cycle execution latency of the MULTIPLY operation. The "$store_{-4}$" operation is supplied with a None operand data value from the logical belt and thus is discarded and acts as an equivalent of a no-op due to the semantics of the None operand data value in conjunction with the non-speculable STORE operation. The bottom part of FIG. 7A shows the configuration of the logical belt after the first iteration (iteration 0) of the per-cycle steady state operations. Note that the None data value can be dropped onto the logical belt in front of the operand data value resulting from the "$load_0$" operation due to a predefined ordering rule where operand drops onto the front of the logical belt that result from the RETIRE operation (if any) are positioned on the front of the logical belt ahead of the operand drops onto the front of the logical belt from other operations in the same machine cycle.

Figure 7B:
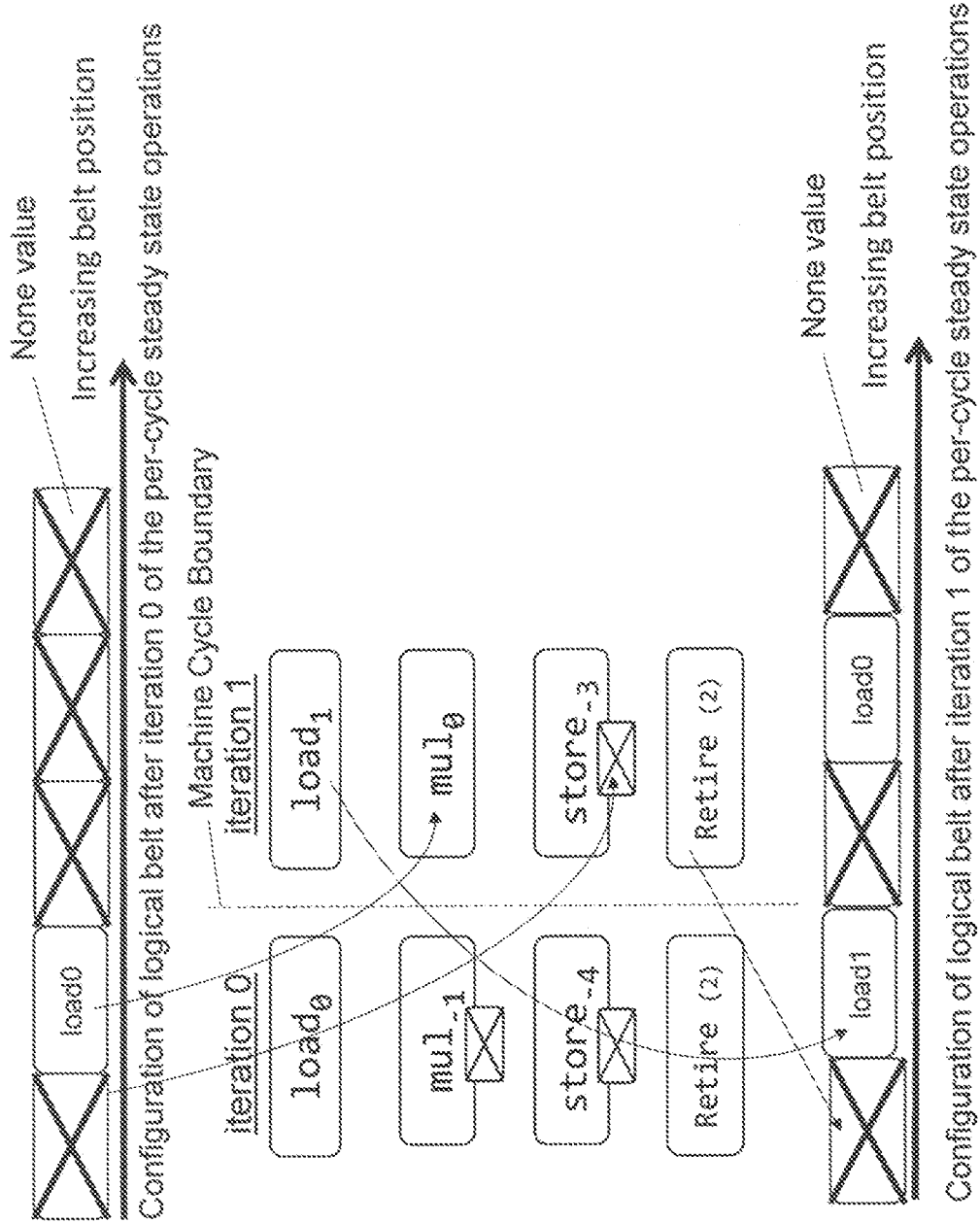

The top part of FIG. 7B shows the configuration of the logical belt after the first iteration (iteration 0) of the per-cycle steady state operations as shown in FIG. 7A. The middle part of FIG. 7B depicts the second iteration (iteration 1) of the per-cycle steady state operations where the operand data value resulting from the "$load_1$" operation along with one None operand data value resulting from the "RETIRE" operation are retired (e.g., dropped onto the logical belt). The None operand data value resulting from the "RETIRE" operation can be dropped onto the front of the logical belt in a belt position just in front of the operand data value resulting from the "$load_1$" operation as shown. The "$mul_0$" is supplied with the operand data value resulting from the "$load_0$" operation as stored on the logical belt and does not produce any result in this machine cycle due to the three (3) cycle execution latency of the MULTIPLY operation. The "$store_{-3}$" operation is supplied with a None operand data value from the logical belt and thus is discarded and acts as an equivalent of a no-op due to the semantics of the None operand data value in conjunction with the non-speculable STORE operation. The bottom part of FIG. 7B shows the configuration of the logical belt after the second iteration (iteration 1) of the per-cycle steady state operations. Note that the None data value can be dropped onto the logical belt in front of the operand data value resulting from the "$load_1$" operation due to a predefined ordering rule where operand drops onto the front of the logical belt that result from the RETIRE operation (if any) are positioned on the front of the logical belt ahead of the operand drops onto the front of the logical belt from other operations in the same machine cycle.

Figure 7C:
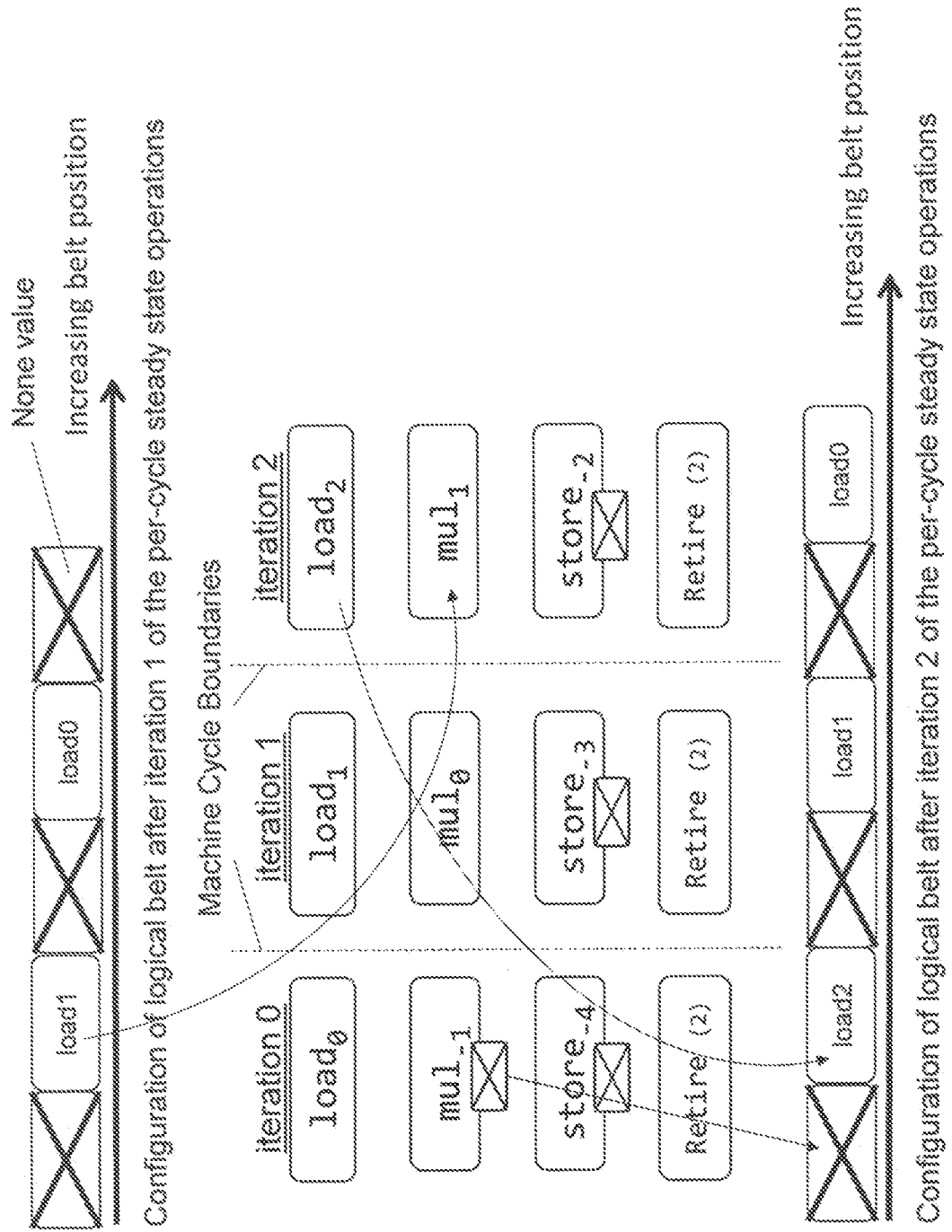

The top part of FIG. 7C shows the configuration of the logical belt after the second iteration (iteration 1) of the per-cycle steady state operations as shown in FIG. 7B. The middle part of FIG. 7C depicts the third iteration (iteration 2) of the per-cycle steady state operations where the operand data value resulting from the "$load_2$" operation along with one None operand data value resulting from the "$mul_{-1}$" operation. The "$mul_{-1}$" operation generates a None operand data value in this machine cycle due the semantics of the None operand data value in conjunction with the speculable MULTIPLY operation. The None operand data value resulting from the "$mul_{-1}$" operation is dropped onto the front of the logical belt in a belt position just in front of the operand data value resulting from the "$load_2$" operation. The "$mul_1$" operation is supplied with the operand data value resulting from the "$load_1$" operation as stored on the logical belt and does not produce any result in this machine cycle due to the three (3) cycle execution latency of the MULTIPLY operation. The "$store_{-2}$" operation is supplied with a None operand data value from the logical belt and thus is discarded and acts as an equivalent of a no-op due to the semantics of the None operand data value in conjunction with the non-speculable STORE operation. The bottom part of FIG. 7C shows the configuration of the logical belt after the third iteration (iteration 2) of the per-cycle steady state operations. Note that the None data value is dropped onto the logical belt in front of the operand data value resulting from the "$load_2$" operation due to a predefined ordering rule based on execution latency of operations as described herein.

Figure 7D:
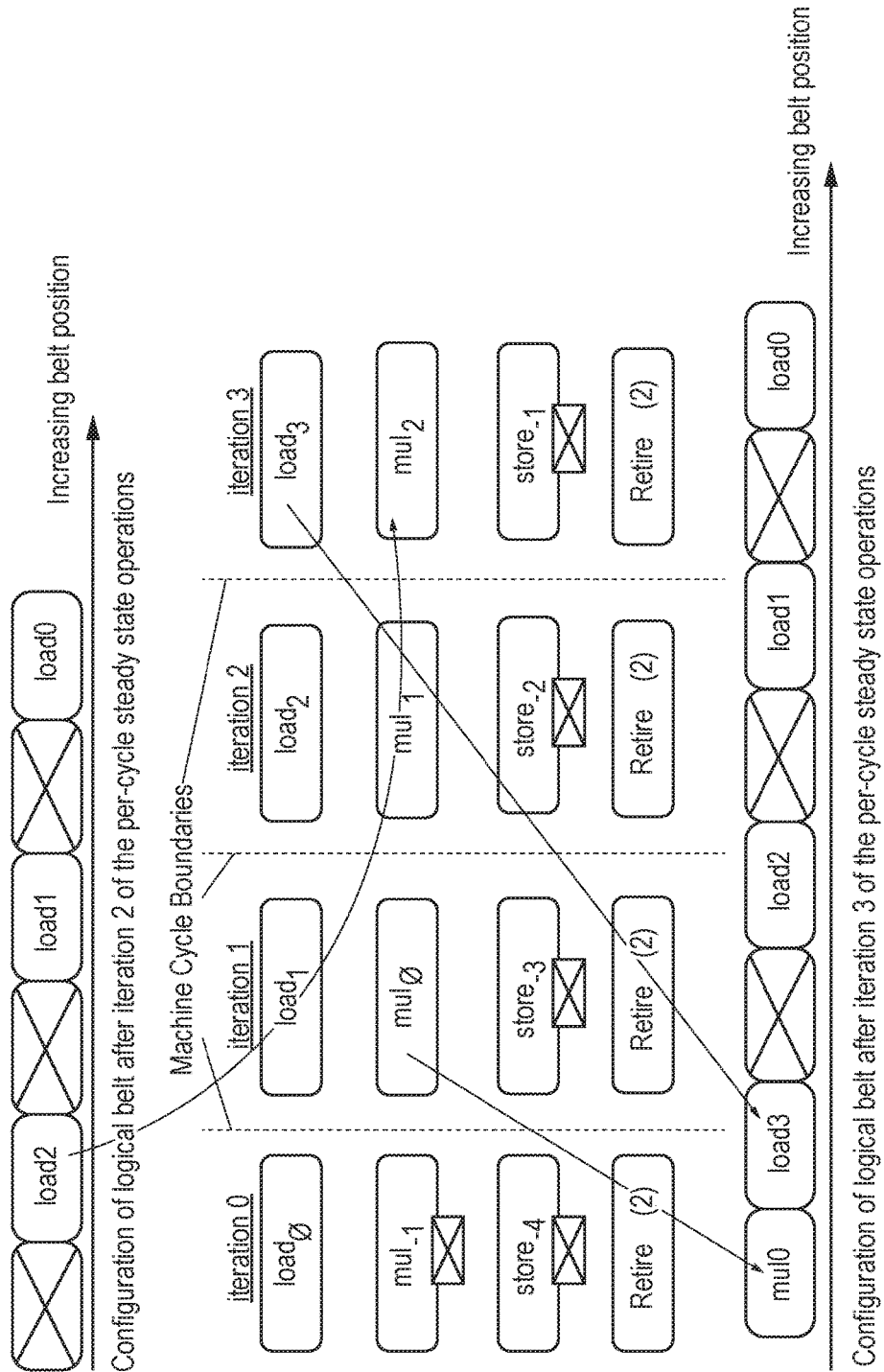

The top part of FIG. 7D shows the configuration of the logical belt after the third iteration (iteration 2) of the per-cycle steady state operations as shown in FIG. 7C. The middle part of FIG. 7D depicts the fourth iteration (iteration 3) of the per-cycle steady state operations where the operand data value resulting from the "$load_3$" operation along with operand data value resulting from the "$mul_0$" operation are retired (e.g., dropped onto the logical belt). The "$mul_0$" operation generates a result operand data value in this machine cycle due the three (3) cycle execution latency of the MULTIPLY operation. The operand data value resulting from the "$mul_0$" operation can be dropped onto the front of the logical belt in a belt position just in front of the operand data value resulting from the "$load_3$" operation as shown. The "$mul_2$" operation is supplied with the operand data value resulting from the "$load_2$" operation as stored on the logical belt and does not produce any result in this machine cycle due to the three (3) cycle execution latency of the MULTIPLY operation. The "$store_{-1}$" operation is supplied with a None operand data value from the logical belt and thus is discarded and acts as an equivalent of a no-op due to the semantics of the None operand data value in conjunction with the non-speculable STORE operation. The bottom part of FIG. 7D shows the configuration of the logical belt after the fourth iteration (iteration 3) of the per-cycle steady state operations. Note that the operand data value resulting from the "$mul_0$" operation can be dropped onto the logical belt in front of the operand data value resulting from the "$load_3$" operation due to a predefined ordering rule based on execution latency of operations as described herein.

Figure 7E:
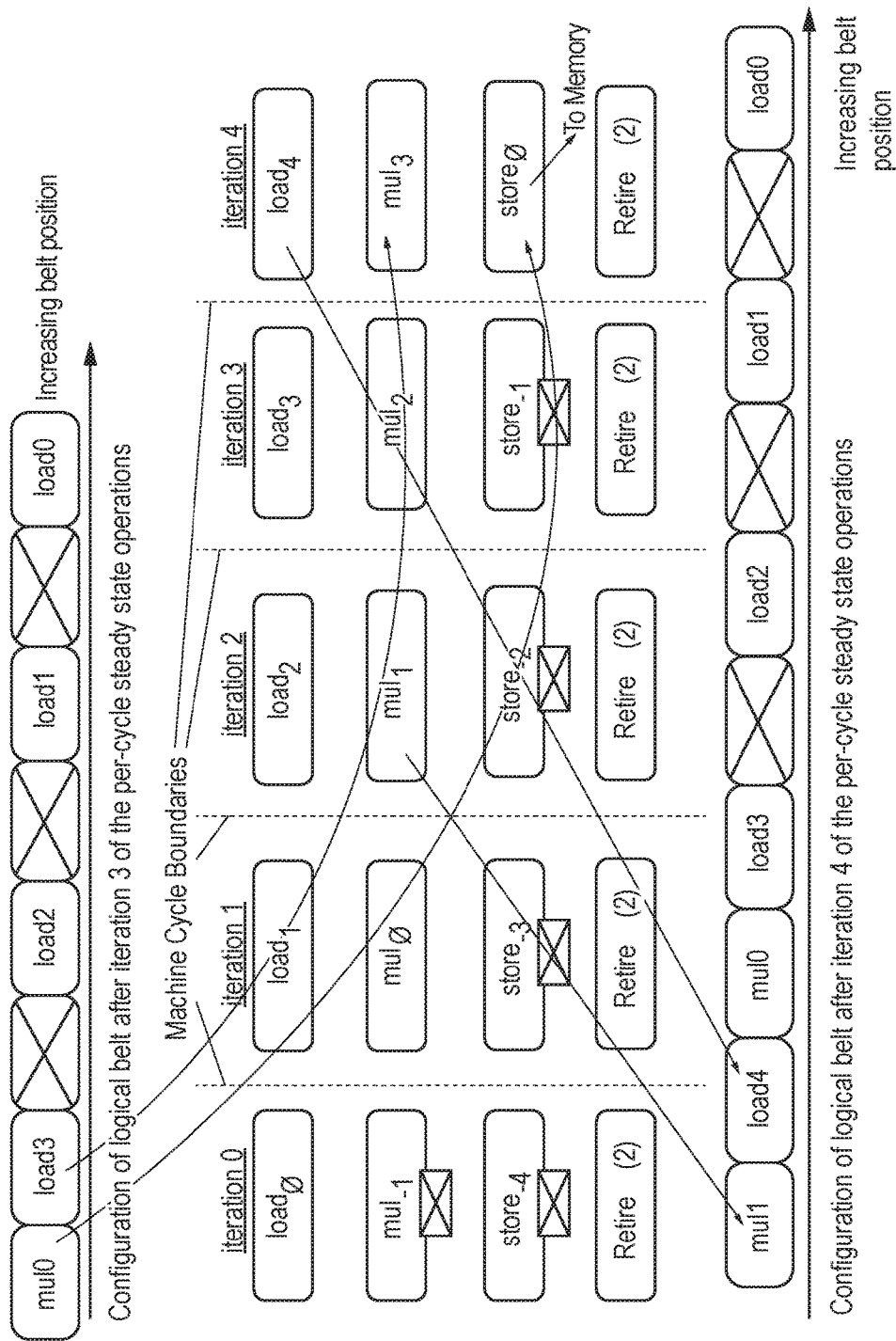

The top part of FIG. 7E shows the configuration of the logical belt after the fourth iteration (iteration 3) of the per-cycle steady state operations as shown in FIG. 7D. The middle part of FIG. 7E depicts the fifth iteration (iteration 4) of the per-cycle steady state operations where the operand data value resulting from the "$load_4$" operation along with operand data value resulting from the "$mul_1$" operation are retired (e.g., dropped onto the logical belt). The "$mul_1$" generates a result operand data value in this machine cycle due the three (3) cycle execution latency of the MULTIPLY operation. The operand data value resulting from the "$mul_1$" operation can be dropped onto the front of the logical belt in a belt position just in front of the operand data value resulting from the "$load_4$" operation as shown. The "$mul_3$" operation is supplied with the operand data value resulting from the "$load_3$" operation as stored on the logical belt and does not produce any result in this machine cycle due to the three (3) cycle execution latency of the MULTIPLY operation. The "$store_0$" operation is supplied with the operand data value resulting from the "$mul_0$" operation as stored on the logical belt and writes this operand data vale to memory. The bottom part of FIG. 7E shows the configuration of the logical belt after the fifth iteration (iteration 4) of the per-cycle steady state operations. Note that the operand data value resulting from the "$mul_1$" operation can be dropped onto the logical belt in front of the operand data value resulting from the "$load_4$" operation due to a predefined ordering rule based on execution latency of operations as described herein.

Note that the fifth iteration (iteration 4) of the per-cycle steady state operations as depicted in FIG. 7E represents the steady state operations of the loop. As such, similar operations are carried out over the remaining successive iterations of the loop.

The compiler can also be configured to carry out software pipelining in a manner that uses INNER and LEAVE operations so as to avoid the need for the epilogue in the resulting software pipelined loop. While the loop may overrun its condition, beginning in-flight iterations that are past the actual last iteration, the LEAVE operation discards all that in-flight state without an epilogue being needed to wind it down. The ability of INNER operation to create a new belt with suitable initial values permits a bulk set-up of the belt contents matching the steady state of the loop. The ability of LEAVE operation to return a loop result permits search-like loops to pass transient values from the loop frame back to the surrounding code, while discarding transients that are no longer needed.

If the loop requires more active transient data, including loop-carried variables, than fit in the belt then there must be a place to put the transients. The place cannot be static if more than one instance of a particular transient result (belonging to different iterations) must be simultaneously live. The compiler can be configured to employ the scratchpad rotators and the ROTATE operation to use a static address for all instances while changing the physical address with each iteration by rotating the allocated scratchpad region.

Figure 8:
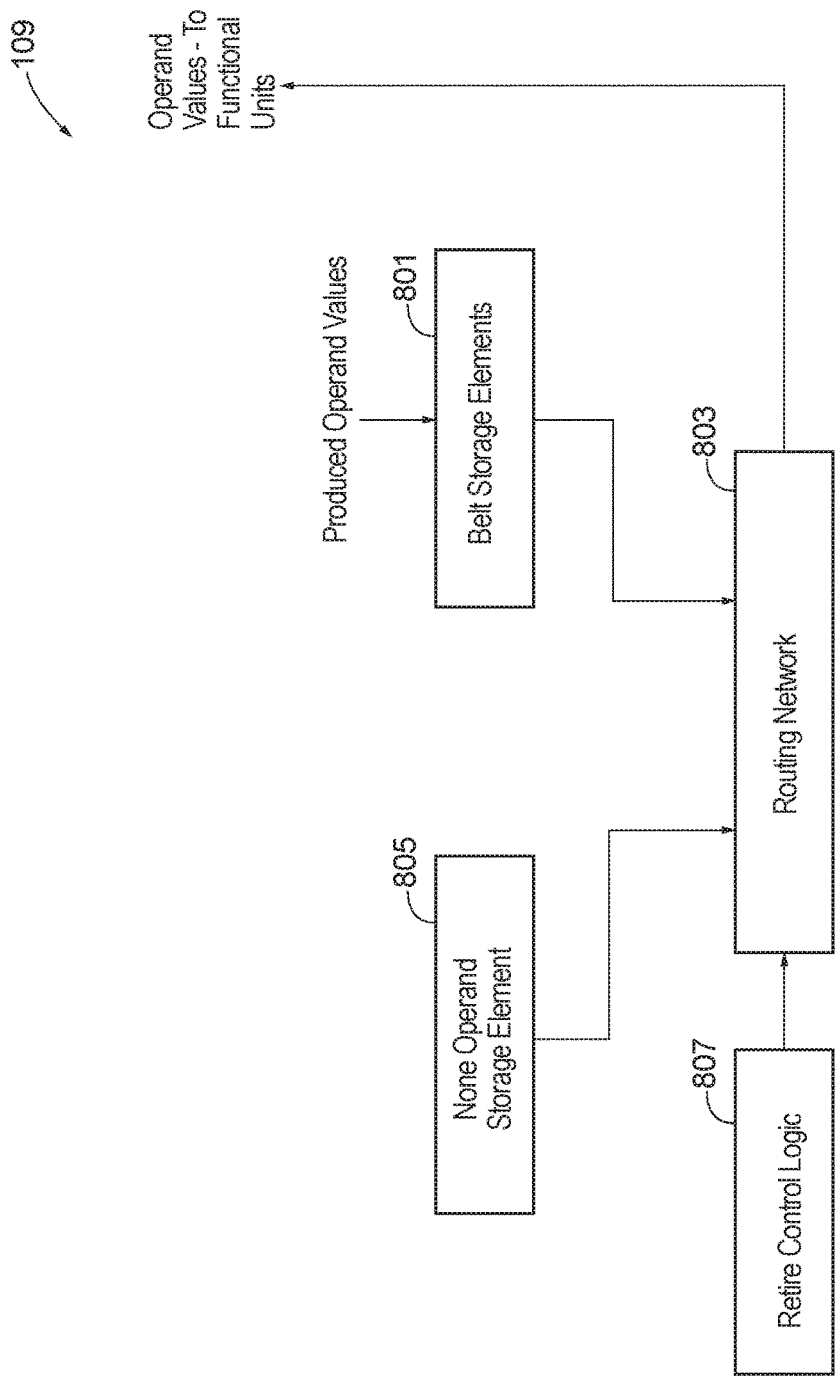
FIG. 8 is a schematic illustration of None operand storage element(s), belt operand storage elements, and a routing network configured by retire control logic, which can be part of the execution logic of FIG. 1A.

FIG. 8 shows an embodiment of the execution logic 109 of the CPU that supports execution of the RETIRE operation (or the RETIRE WITH WIDTH LIST operation) as described herein. In this embodiment, the logical belt is realized by a number of belt storage elements 801 with a dynamically configured routing network 803 coupled between the belt storage elements 801 and the functional units of the execution logic 109. The execution logic 109 also includes one or more storage elements (one shown as 805) that is configured to store the data (bits) that represents a None operand data value (such as a None operand data value of undefined scalarity and element width and possibly scalar None operand data values with different element widths and possibly vector None operand data values with different element widths). The state and ordering of the logical belt over time as viewed by the program can be controlled by the configuration of the routing network 803 (i.e., the configuration of the connections of belt storage elements 801 or the storage elements 805 to functional units) over time. Retire control logic 807 is configured to dynamically configure the routing network 803 according to the integer value specified in a RETIRE operation (or the tag list specified in a RETIRE WITH WIDTH LIST operation). Specifically, the specified integer value (or tag list) is compared to the dynamic count of operands that are to be retired (e.g., dropped onto the logical belt) as a result of other operations in the machine cycle in which RETIRE operation (or the RETIRE WITH WIDTH LIST operation) executes. If the specified integer value (or number of operands in the tag list) is greater than the number of operands that are to be retired (dropped onto the logical belt) as a result of such other operations, then the retire control logic 803 dynamically configures the routing network 803 such that the necessary None operand data element(s) as stored in storage element(s) 805 are part of the logical state of the belt. In the event that more than one None operand data element is to be retired (e.g., dropped onto the logical belt) in the machine cycle in which RETIRE operation (or the RETIRE WITH WIDTH LIST operation) executes, the same None operand data element(s) as stored in storage element(s) 805 can be replicated multiple times as part of the logical state of the belt. If the specified integer value (or number of operands in the tag list) and the number of operands that are to be retired (e.g., dropped onto the logical belt) as a result of such other operations are equal, then the retire control logic 803 treats the RETIRE operation (or the RETIRE WITH WIDTH LIST operation) as a no-op such that it does not affect the logical state of the belt. If the specified integer value (or number of operands in the tag list) is less than the number of operands that are to be retired (e.g., dropped onto the logical belt) as a result of such other operations, then the retire control logic 803 signals a fault by whatever mechanism the implementation uses to indicate an error condition.

In other embodiments, the scratchpad, the extended scratchpad and/or the spiller unit as described herein can be used with a general-register CPU that employs a set of registers (e.g., a register file), instead of the logical belt, to store operands produced and consumed by the functional units of the CPU. Furthermore, the logical-to-physical address mapping mechanisms (including the rotators) for accessing the scratchpad (and possibly for the extended scratchpad) as described herein can also be used with the general-register CPU. Furthermore, the explicit SCRATCHF, SCRATCHD and ROTATE operations for managing the logical space of the scratchpad (and possibly for the extended scratchpad) as described herein can also be used with the general-register CPU. And the explicit INNER and LEAVE operations for initiating and exiting a loop frame as described herein can also be used with the general-register CPU.

The architectural enhancements of the CPU as described herein has many advantages. For example, the scratchpad can be configured to efficiently pack small operands together in a configurable byte map region of the scratchpad, obviating waste of fixed sized register designs. In another example, the scratchpad can be configured to have a large number of rotators corresponding to levels of nesting of loops and thus allow for efficient software pipelining of nested loops. In yet another example, the CPU can be configured to employ the logical belt for storage of transient operands, and only long-lived (cross-iteration) data is spilled to the scratchpad. This avoids dead data in the scratchpad, which together with the byte-packing of operands means that a given loop's data can fit in a substantially smaller number of hardware buffer elements on the CPU, which saves area and power. Furthermore, the software-pipelining techniques of the compiler as described above can be implemented in other software tools for code generation, including optimizers and just-in-time compilers and the like.

There have been described and illustrated herein several embodiments of a computer processor and corresponding method of operations as well as a compiler that uses the architectural features of the computer processor for scheduling software pipelined loops. While particular embodiments of the invention have been described, it is not intended that the invention be limited thereto, as it is intended that the invention be as broad in scope as the art will allow and that the specification be read likewise. For example, the functionality of the CPU as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope.

What is claimed is:
1. A computer processor comprising:
   a plurality of operand storage elements that store operand data values; and
   execution logic including a number of functional units operably coupled to the plurality of operand storage elements, wherein the execution logic is configured to perform operations that access said operand data values stored in the plurality of operand storage elements;
   wherein said operand data values include a predefined None operand data value that is indicative of a missing operand value;
   wherein said operations include a RETIRE operation that specifies first data representing a number of operand data values that is intended to be retired in a predefined machine cycle, wherein the first data is selected from i) an integer value representing a static count of operand data values that is intended to be retired in the predefined machine cycle, and ii) a list of one or more tags specifying scalarity and element width for a corresponding operand data value that is intended to be retired in the predefined machine cycle, wherein the number of tags in the list represents a static count of operand data values that is intended to be retired in the predefined machine cycle; and
   wherein, during execution of the RETIRE operation, zero or more None operand data values are selectively retired in the predefined machine cycle based on comparison of the first data representing the number of operand data values specified by the RETIRE operation and second data representing the number of operand data values to be retired as a result of execution of other operations by the execution logic in the predefined machine cycle.

2. A computer processor according to claim 1, wherein: the execution logic is configured such that, when processing a speculable operation that operates on a None operand data value, the None operand data value propagates to a result of such speculable operation.

3. A computer processor according to claim 1, wherein: the execution logic is configured such that, when processing a non-speculable operation that operates on a None operand data value to update state information of the computer processor, the execution logic skips the non-speculable operation and thus does not update the state information of the computer processor.

4. A computer processor according to claim 3, wherein: the non-speculable operation comprises a store operation that writes operand data to memory.

5. A computer processor according to claim 1, wherein: during execution of the RETIRE operation, in the event that the comparison determines that the number of operand data values specified by the first data of the RETIRE operation is greater than the number of operand data values to be retired as specified by the second data, the execution of the RETIRE operation is configured to retire a number of None operand data values representing the difference between the first data specified by the RETIRE operation and the second data representing the number of operand data values to be retired as a result of execution of other operations by the execution logic in the predefined machine cycle.

6. A computer processor according to claim 1, wherein: during execution of the RETIRE operation, in the event that the comparison determines that the number of operand data values specified by the first data of the RETIRE operation matches the number of operand data values specified by the second data, the execution of the RETIRE operation is configured to perform a no-op.

7. A computer processor according to claim 1, wherein: during execution of the RETIRE operation, in the event that the comparison determines that the number of operand data values specified by the first data of the RETIRE operation is less than the number of operand data values specified by the second data, the execution of the RETIRE operation signals a machine fault.

8. A computer processor according to claim 1, wherein: the predefined machine cycle is the machine cycle in which the RETIRE operation executes.

9. A computer processor according to claim 1, wherein: the plurality of operand storage elements are organized as a logical belt.

10. A computer processor according to claim 9, wherein: during execution of the RETIRE operation, the zero or more None operand data values are retired in the predefined machine cycle by dropping the zero or more None operand data values onto the logical belt.

11. A computer processor according to claim 9, wherein: during execution of the RETIRE operation, the zero or more None operand data values are retired in the predefined machine cycle by dropping the zero or more None operand data values onto the front of the logical belt.

12. A computer processor according to claim 1, wherein:
during execution of the RETIRE operation, zero or more None operand data values of undefined scalarity and element width are retired in the predefined machine cycle.

13. A computer processor according to claim 1, wherein:
the RETIRE operation specifies the integer value representing the static count of operand data values that is intended to be retired in the predefined machine cycle.

14. A computer processor according to claim 1, wherein:
the RETIRE operation specifies the list of one or more tags specifying scalarity and element width for the corresponding operand data value that is intended to be retired in the predefined machine cycle, wherein the number of tags represents the static count of operand data values that is intended to be retired in the predefined machine cycle.

15. A computer processor according to claim 1, wherein:
the operand data values are stored with associated meta-data as unitary operand data elements in the plurality of operand storage elements.

16. A computer processor according to claim 15, wherein:
a unitary operand data element is selected from a group consisting of i) a scalar operand type that represents a single scalar operand value and ii) a vector operand type that represents a number of scalar operand values.

17. A computer processor according to claim 16, wherein:
the single scalar operand value represented by the scalar operand type has one of a number of predefined widths in bytes, and the meta-data associated with the single scalar operand value as part of the unitary operand data element of the scalar operand type further specifies the one of the predefined widths in bytes.

18. A computer processor according to claim 16, wherein:
the meta-data associated with a given operand data value as part of the unitary operand data element of vector operand type further specifies one of a number of predefined widths in bytes.

19. A computer processor according to claim 15, wherein:
an operand data value is represented by at least one payload data element that is physically associated with meta-data of a unitary data element.

20. A computer processor according to claim 1, wherein:
the execution logic further supports an INNER operation whose execution defines a new empty logical belt for operations of a loop.

21. A computer processor according to claim 20, wherein:
the execution logic further supports a LEAVE operation that is paired with the INNER operation for the operations of the loop, wherein the execution of the LEAVE operation restores the logical belt to its state prior to execution of the paired INNER operation and then drops arguments specified as part of the LEAVE operation onto the front of the restored logical belt.

22. The computer processor according to claim 1, wherein:
the execution logic is further configured to execute a loop of operations with a loop body and loop head that includes number of operations repeated for all iterations of the loop, wherein such loop head includes a RETIRE operation that specifies a number of operand data values that is intended to be retired for steady state operations of the loop body.

23. The computer processor according to claim 22, wherein:
the loop of operations omits any prologue.

* * * * *